(12) United States Patent
Matsumoto et al.

(10) Patent No.: US 6,690,860 B2
(45) Date of Patent: Feb. 10, 2004

(54) METHOD OF MANUFACTURING GRATING

(75) Inventors: Sadayuki Matsumoto, Tokyo (JP); Takuya Ohira, Tokyo (JP); Masakazu Takabayashi, Tokyo (JP); Kiichi Yoshiara, Tokyo (JP); Shigeru Matsuno, Tokyo (JP); Hajime Takeya, Tokyo (JP); Junichiro Hoshizaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 186 days.

(21) Appl. No.: 09/891,319

(22) Filed: Jun. 27, 2001

(65) Prior Publication Data

US 2002/0081068 A1 Jun. 27, 2002

(30) Foreign Application Priority Data

Dec. 26, 2000 (JP) ........................................ 2000-394579

(51) Int. Cl.[7] ................................................. G02B 6/34
(52) U.S. Cl. ....................................................... 385/37
(58) Field of Search ........................... 385/37; 430/321, 430/290

(56) References Cited

U.S. PATENT DOCUMENTS 5,912,999 A * 6/1999 Brennan et al. ............... 385/37
6,021,242 A * 2/2000 Harumoto et al. ............. 385/37
6,253,008 B1 * 6/2001 Harumoto et al. ............. 385/37
2003/0007729 A1 * 1/2003 Rondinella et al. ........... 385/37

FOREIGN PATENT DOCUMENTS

| EP | 1065535 A2 | * 1/2001 | ........... 385/37 |
| JP | 10-62636 A | 3/1998 | |
| JP | 10-90545 A | 4/1998 | |

OTHER PUBLICATIONS

Feng et al.; "Dynamic Dispersion Compensation in a . . . Fiber Bragg Grating", *IEEE Photonics Technology Letters*, vol 11, No. 3, pp. 373–375, Mar. 1999.

Durkin et al., "Advanced Fibre Bragg . . . in DWDM Systems", *OF2000 Technical Digest*, pp. 121–123, Mar. 2000.

* cited by examiner

*Primary Examiner*—Akm Enayet Ullah
*Assistant Examiner*—Mike Stahl
(74) *Attorney, Agent, or Firm*—Leydig, Voit & Mayer, Ltd.

(57) ABSTRACT

A method of manufacturing a grating in an optical waveguide that includes a core and a cladding covering the core. The method includes scanning a laser beam along an optical axis of the optical waveguide to modulate the refractive index of the core. The core is made of a material having a refractive index that is changeable upon irradiation by radiation. In addition, in scanning the core, the irradiation range of the laser beam is controlled and the core is scanned several times. Therefore, a predetermined distribution of irradiation is obtained in a direction of the optical axis of the grating.

15 Claims, 14 Drawing Sheets

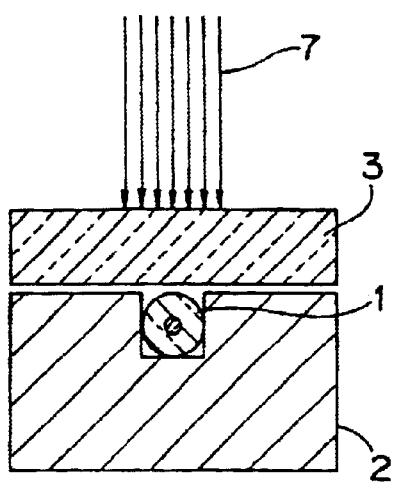
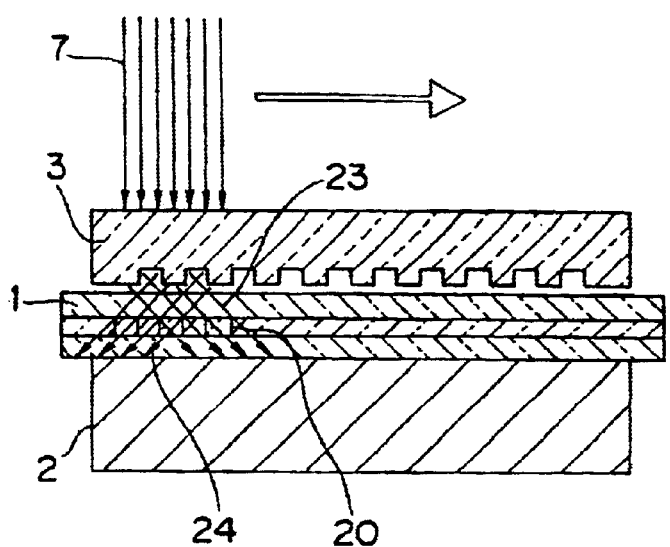

EXPANSION

CONTRACTION    EXPANSION

CONTRACTION    EXPANSION

METHOD OF MANUFACTURING GRATING

BACKGROUND OF THE INVENTION

1. Field of the Invention

The present invention relates to a method of manufacturing a grating which modulates refractive index in an optical waveguide such as an optical fiber or a planar lightwave circuit and, more particularly, to a method of manufacturing a grating of a grating device such as a band-pass filter or a dispersion equalization device used in an optical communication system which need precise characteristics.

2. Description of the Prior Art

In an expected high density wavelength division multiplex transmission system (hereinafter referred to as DWDM transmission system) having a wavelength interval of 50 GHz (wavelength: 0.4 nm) or 25 GHz (wavelength: 0.2 nm) expected to be realized, a band-pass filter obtained by disposing a grating in an optical waveguide such as an optical fiber or a planar lightwave circuit (hereinafter referred to as PLC) is a necessary device. In a future ultra-high speed transmission system having a bit rate of not less than 10 Gbit/s, or not less than 40 Gbit/s, a dispersion equalization device obtained by disposing a grating in an optical waveguide is a necessary device.

The grating device such as a band-pass filter or a dispersion equalization device can be manufactured such that, for example, the interference fringes of an ultraviolet laser beam are irradiated on an optical waveguide such as an optical fiber or a planar lightwave circuit (PLC) obtained by adding Ge to a core consisting of silica. In addition, more specifically, the grating device is manufactured by the following operations. An optical waveguide is left in high-pressure hydrogen of several 10 to several 100 atms for several days to several weeks to fill hydrogen in the optical waveguide, and a change in refractive index by ultraviolet irradiation is sensitized. The interference fringes of ultraviolet laser beams split into two-beam of light by a phase mask or a half-mirror, and a change in refractive index depending on the interference fringes is formed. The formation of the change in refractive index depending on the interference fringes is called modulation, and the magnitude of the change is called the degree of refractive index modulation. When a grating pitch of the grating formed in the optical waveguide is represented by $\Lambda$, and when an equivalent refractive index of the optical waveguide is represented by $N_{\mathit{eff}}$, of light components being incident on the optical waveguide, a light component having a wavelength $\lambda_B$ which satisfies the following Equation 1 causes Bragg reflection and is reflected on the incident side.

[Equation 1]

$$\lambda_B = 2 \cdot N_{\mathit{eff}} \cdot \Lambda \quad (1)$$

Note that an equivalent refractive index is an equivalent refractive index which is received by a light component propagated through the optical waveguide, is determined by an interactive operation between a core and a cladding, and is also called an effective refractive index or a valid refractive index.

When a wavelength $\lambda_B$ which satisfies the relationship of Equation 1 is set to be constant over the entire grating, only a light component having a specific wavelength can be efficiently reflected. For this reason, a band-pass filter having a band-pass characteristic which is considerably sharp can be obtained. On the other hand, the grating pitch $\Lambda$ or the equivalent refractive index $N_{\mathit{eff}}$ of the grating are changed in a propagation direction to form a chirp grating the Bragg wavelength $\lambda_B$ is changed depending on the position of the grating, so that a dispersion equalization device such as a dispersion compensator or a dispersion slope compensator can be obtained.

In order to obtain a characteristic used in an application of the band-pass filter or a dispersion equalization device, high precision is required to manufacture the grating. More specifically, in a band having a wavelength of 1.55 $\mu$m used in an optical communication system, a grating pitch is about 500 nm, and the grating should be uniformly manufactured over a length from about several mm to about 100 mm of the grating. In addition, since the degree of refractive index modulation or the equivalent refractive index $N_{\mathit{eff}}$ also changes by an irradiation amount of an ultraviolet laser beam, the ultraviolet laser beam should be irradiated at a high precision over the entire length of the grating. The error of the grating pitch from the design is called a phase error, and an error of the degree of refractive index modulation or the equivalent refractive index $N_{\mathit{eff}}$ is called an amplitude error. These errors cause degradation of an amount of out-of-band attenuation in a band-pass filter, and cause a ripple of a group delay time characteristic, i.e., a group delay ripple in an dispersion equalization device. This fact is described in [Richardo Feced, et al., "Effect of Random Phase and Amplitude Errors in Optical Fiber Bragg Gratings", Journal of Lightwave Technology, Vol. 18, No. 1, pp. 90–101, January, 2000, issued by IEEE].

As methods of manufacturing gratings the errors of which are reduced, several methods are proposed. For example, in a method of manufacturing an optical waveguide diffraction grating disclosed in Japanese Laid-Open Patent Publication No. 8-286066, as shown in the perspective view in FIG. 17, fluorescence having a predetermined wavelength (about 240 nm) irradiated to detect fluorescence generated when the grating is formed, and alignment is performed such that an amount of received fluorescence is maximum. More specifically, when an ultraviolet laser beam having a wavelength of about 240 nm is irradiated on an optical fiber, fluorescence having wavelength of 350 to 550 nm is generated by the core of the optical fiber. A part of the generated fluorescence is propagated through the optical fiber to reach a detector 8. An amount of fluorescence received by the detector 8 is adjusted to maximum, so that a laser beam irradiated on the core of the optical fiber 1 is maximum. As an ultraviolet laser having a wavelength of 240 nm, a KrF excimer laser (wavelength of 248 nm) and a second harmonic (wavelength of 244 nm) of an argon laser are known.

In [Komukai Tetsuro, et al., "Examination of Cause of Generation of Group Delay Ripple in Chirp Fiber Grating", Technical Report of the Institute of Electronics, Information and Communication Engineers OFT2000-49, pp. 31–35, issued by, a corporation, the Institute of Electronics, Information and Communication Engineers], the following is described. That is, the position of an optical fiber is controlled such that an ultraviolet laser beam is uniformly irradiated by always monitoring fluorescence while scanning an ultraviolet laser beam having a wavelength of 244 nm which is a second harmonic of an argon laser in the direction of the optical axis of the optical fiber. In addition, many causes of group delay ripples generated by chirp gratings used as dispersion equalization device exist in processes in manufacturing the gratings, the following causes will be described:

(1) Fluctuation of the power or mode of an ultraviolet laser beam to be irradiated (amplitude error).

(2) Fluctuation of the composition of the core of an optical waveguide such as an optical fiber in the longitudinal direction.
(3) Incompletion of apodization of a chirp grating.
(4) A positional error between a phase mask and an optical waveguide caused by mechanical vibration (phase error).
(5) Incompletion of positional control of an optical waveguide and laser beam irradiation (amplitude error).
(6) Insufficiency of washing of an optical waveguide (amplitude error).
(7) Incompletion of a phase mask such as a stitching error (amplitude error and phase error).

On the other hand, in a method of manufacturing a grating disclosed in Japanese Laid-Open Patent Publication No. 10-90545, as shown in FIG. 18, heat generated when a KrF excimer laser beam having a wavelength of 248 nm and serving as an ultraviolet laser beam is irradiated on an optical waveguide formed in a PLC is radiated through a heat radiator. In this case, when the ultraviolet laser beam is irradiated for several minutes to several ten minutes to manufacture a grating, a part of the ultraviolet laser beam reaching a substrate through a cladding and a core is absorbed to heat the substrate. Heat generated at this time is radiated from a PLC 1 through a heat radiator 5. In this manner, an increase in temperature of the entire PLC 1 is suppressed to ±10° C. or less, and the grating pitch is suppressed from being changed by thermal expansion of the PLC 1.

However, even though the various error generation causes described above are prevented, a phase error is inevitably generated. More specifically, when an ultraviolet laser beam having a beam width of several mm or less is scanned in the direction of the optical axis of the optical waveguide to manufacture a grating, an error of a grating pitch caused by thermal expansion by local heating, i.e., distortion is generated in the optical waveguide. A phase error is generated by the distortion of the grating pitch. As a cause of the distortion of the grating pitch, the following may be considered. In general, since an optical waveguide consists of silica ($SiO_2$) as a main component, the thermal expansion coefficient of the optical waveguide is small, the optical waveguide has a thermal expansion coefficient of about $10^{-6}$. For this reason, for example, when an ultraviolet laser beam having a beam width of 1 mm is irradiated on a region of an optical waveguide having a length of 1 mm to increase the temperature of the region by several degrees centigrade, the region of 1 mm thermally expands by about several nm to push another region out every several nm. Since the ultraviolet laser beam is scanned along the optical axis of the optical waveguide, the irradiated region thermal expands by several nm when another region of the optical waveguide is irradiated, and another part is pushed out every several nm. In this manner, even though a local temperature increases by only several degrees centigrade by the irradiation of the ultraviolet laser beam, a fluctuation of about plus or minus several nm of the grating pitch occurs. Since the grating pitch is about 500 nm, for example, even though the fluctuation of about several nm occurs, the grating is considerably influenced, and the fluctuation causes a phase error to generate a group delay ripple. This group delay ripple adversely affects not only a chirp grating used in a dispersion equalization device, but also a uniform grating used in a band-pass filter.

In addition, in general, as described in a method of manufacturing an optical waveguide diffraction grating described in Japanese Laid-Open Patent Publication No. 8-286066, an ultraviolet laser beam having a wavelength of about 240 nm is used. As the ultraviolet laser beam, a KrF excimer laser (wavelength of 248 nm) and a second harmonic (wavelength of 244 nm) of an argon laser are known. However, since the time and space stabilities of the coherence and energy of the KrF excimer laser are not good, the KrF excimer laser is not stable for manufacturing a precise grating. In addition, although the second harmonic of the argon laser has high coherence, the second harmonic is continuously oscillated. For this reason, efficiency of change in refractive index is poor, and a large energy density is required to obtain a sufficient degree of refractive index modulation. Therefore, an argon laser beam is converged to be irradiated on the optical waveguide, an irradiation amount of the ultraviolet laser beam considerably varies because of a small positional error, and an amplitude error is generated. In addition, although the laser beam is irradiated on the optical waveguide with a large energy density by convergence, local thermal expansion of the optical waveguide is not considered. For this reason, slight fluctuation occurs in the grating pitch, and a phase error is also generated.

The conventional technique described above is examined, a method of manufacturing a grating described in Japanese Laid-Open Patent Publication No. 10-90545 is to keep the temperature of an entire PLC in which an optical waveguide is formed constant. Therefore, when an ultraviolet laser beam is uniformly irradiated on the entire optical waveguide, no problem is posed. However, local thermal expansion caused by local heating when an ultraviolet laser beam having a beam width of several mm or less is scanned to be irradiated on the optical waveguide is not considered. More specifically, even though a heat radiator or a heat sink is arranged on the entire PLC, or cooling is forcibly performed, the optical waveguide at a portion on which the ultraviolet laser beam is irradiated locally thermally expands. In other words, for example, when no heat radiator or the like is arranged, the temperature of the portion on which the ultraviolet laser beam is irradiated with reference to the temperature of the peripheral portion can be kept constant on the average even if a heat radiator or a cooling mechanism is disposed on the portion. This configuration is not sufficient to cancel a difference between temperatures of the peripheral portion of the portion on which the ultraviolet laser beam is irradiated. Therefore, the slight fluctuation occurs in the grating pitch as described above, and a phase error is generated.

SUMMARY OF THE INVENTION

It is the first object of the present invention to provide a method of manufacturing a grating in which local thermal expansion occurring, when an ultraviolet laser beam is scanned on an optical waveguide to manufacture a grating, is suppressed to reduce a phase error. It is the second object of the present invention to provide a method of manufacturing a grating in which an amplitude error is reduced.

In accordance with one aspect of the present invention, there is provided a method of manufacturing a grating in an optical waveguide. The optical waveguide includes a core and a cladding covering the core. The core is made of a material having the refractive index that is changeable by irradiation of radiation (e.g. ultraviolet rays). The method includes the steps of providing the optical waveguide and scanning laser beam along an optical axis of the optical waveguide to form modulation of refractive index of the radiation (e.g. ultraviolet rays) in the core. In addition, on the step of scanning the laser beam, in the core, an irradiation range of the rays is controlled, and the laser beam is scanned a plurality of times. Then predetermined distribution of irradiation amount is obtained in a direction of the optical axis of the grating. Preferably, the laser beam may be ultraviolet laser beam.

In another aspect of the present invention, there is provided a method of manufacturing a grating in an optical waveguide. The optical waveguide includes a core and a cladding covering the core. The core is made of a material having the refractive index that is changeable by irradiation of radiation (e.g. ultraviolet rays). The method includes the steps of providing the optical waveguide and scanning laser beam along the optical axis of the optical waveguide to form modulation of refractive index of radiation (e.g. ultraviolet rays) in the core. In addition, on the step of scanning, the laser beam is scanned along the optical axis of the optical waveguide at the scanning speed not lower than the predetermined scanning speed. The scanning speed may be defined by energy density E per unit time of the laser beam and beam diameter B.

In a further aspect of the invention, the laser beam is scanned at the scanning speed not lower than the scanning speed:

$$B^2/(85 \cdot E^{-1.2})(\text{mm/second})$$

defined by the energy density E (W/cm$^2$) per unit time and the beam diameter B (mm).

In a still further aspect of the present invention, on the step of scanning, an irradiation range of radiation (e.g. ultraviolet rays) is controlled, and the laser beam is scanned a plurality of times. Therefore, a predetermined distribution of irradiation amount is obtained in the direction of the optical axis of the grating in the core.

In a yet further aspect of the present invention, the optical waveguide is arranged on a thermal conductive substrate.

In a yet further aspect of the present invention, the laser beam is scanned along the optical axis of the optical waveguide at scanning speed not lower than the predetermined scanning speed. The scanning speed may be defined by energy density E per unit time of the laser beam, beam diameter B, and thermal conductivity k of the thermal conductive substrate.

In a yet further aspect of the present invention, the laser beam is scanned at scanning speed not lower than the scanning speed:

$$B^2/[(115 \cdot k)^{0.5} \cdot E^{-1.2}](\text{mm/second})$$

defined by the energy density E (W/cm$^2$) per unit time, the beam diameter B (mm), and the thermal conductivity k (J/(m·k)) of the thermal conductive substrate.

Preferably, the laser beam may be pulse laser beam. More preferably, the pulse laser beam may be ultraviolet pulse laser beam.

Also, the light source of the pulse laser beam may be a semiconductor light source.

In a yet further aspect of the present invention, the pulse laser beam has an energy density not lower than energy density at a change point where an inclination of a refractive index increase coefficient to energy density per pulse changes.

In a yet further aspect of the present invention, the optical waveguide is arranged on a mirror surface substrate for reflecting a laser beam. In addition, a reflected beam reflected by the mirror surface substrate, when the laser beam is irradiated on the optical waveguide, is monitored to adjust relative positions of an irradiation position of the laser beam and the optical waveguide.

In a yet further aspect of the present invention, in the optical waveguide, the laser beam is scanned while locally cooling a portion on which the laser beam is irradiated.

The optical waveguide may be locally cooled by air.

According to a method of manufacturing a grating in an optical waveguide of the present invention, an irradiation range of laser beam scanned along the longitudinal direction of an optical waveguide is controlled, and scanning is performed a plurality of times, so that a predetermined distribution of irradiation amount can be obtained in the direction of the optical axis of the grating. In this manner, apodization in which a distribution of a predetermined degree of refractive index modulation is formed can be performed. In addition, since a predetermined distribution of irradiation amount can be obtained by performing scanning a plurality of times, an irradiation amount per scanning can be reduced, and distortion of a grating pitch can be suppressed by suppressing local thermal expansion.

According to the method of manufacturing a grating of the present invention, a laser beam is scanned at scanning speed not lower than the scanning speed defined by energy density E per unit time of the laser beam and beam diameter B. For this reason, local thermal expansion of an optical waveguide can be suppressed, and distortion of a grating pitch can be suppressed by reducing a phase error.

According to the method of manufacturing a grating of the present invention, a laser beam is scanned at a scanning speed not lower than a scanning speed: $B^2/(85 \cdot E^{-1.2})$(mm/second) defined by energy density E (unit: W/cm$^2$) per unit time of the laser beam and beam diameter B (unit: mm). For this reason, local thermal expansion of an optical waveguide can be suppressed, and distortion of a grating pitch can be suppressed by reducing phase error.

Furthermore, according to the method of manufacturing a grating of the present invention, an irradiation range of a laser beam scanned along the longitudinal direction of an optical waveguide is controlled, and scanning is performed a plurality of times, so that a predetermined distribution of irradiation amount can be obtained in the direction of the optical axis of the grating. In this manner, apodization in which a distribution of a predetermined degree of refractive index modulation is formed can be performed. In addition, since predetermined distribution of irradiation amount can be obtained by performing scanning a plurality of times, an irradiation amount per scanning can be reduced, and distortion of a grating pitch can be suppressed by suppressing local thermal expansion.

Still more, according to the method of manufacturing a grating of the present invention, since an optical waveguide is arranged on a thermal conductive substrate, local heat generated by irradiation of a laser beam is diffused through the thermal conductive substrate, and local thermal expansion caused by local heating of the optical waveguide is suppressed, so that distortion of a grating pitch can be suppressed by reducing a phase error.

According to the method of manufacturing a grating of the present invention, a laser beam is scanned at a scanning speed not lower than a scanning speed defined by an energy density E per unit time of the laser beam, a beam diameter B, and a thermal conductivity k of a thermal conductive substrate. For this reason, local thermal expansion of the optical waveguide can be suppressed, and distortion of a grating pitch can be suppressed by reducing a phase error.

Furthermore, according to the method of manufacturing a grating of the present invention, the laser beam is scanned at a scanning speed not lower than a scanning speed: $B^2/[(115 \cdot k)^{0.5} \cdot E - 1.2]$ (mm/second) defined by the energy density E (unit: W/cm$^2$) per unit time, the beam diameter B (unit: mm), and the thermal conductivity k (W/(m·k)) of the thermal conductive substrate. For this reason, local thermal expansion of an optical waveguide can be suppressed, and distortion of a grating pitch can be suppressed by reducing a phase error.

Still more, according to the method of manufacturing a grating of the present invention, since an pulse laser beam is used as a laser beam, a high energy density can be obtained, and a change in refractive index can be efficiently caused.

According to the method of manufacturing a grating of the present invention, since an pulse laser beam obtained by a semiconductor light source is used as a laser beam, a distribution of irradiation amount of the laser beam to an optical waveguide caused by time and space changes in intensity of the laser beam has slight fluctuation. For this reason, an amplitude error can be reduced, and a change in refractive index caused by irradiation can be efficiently performed.

Furthermore, according to the method of manufacturing a grating of the present invention, the pulse laser beam has an energy density not lower than an energy density at a change point where an inclination of a refractive index increase coefficient to an energy density per pulse changes. For this reason, a change in refractive index caused by irradiation can be efficiently performed.

Still more, according to the method of manufacturing a grating of the present invention, an optical waveguide is arranged on a mirror surface substrate, and a reflected light component from the mirror surface substrate is monitored to adjust the relative positions of the irradiation position of a laser beam and the optical waveguide. For this reason, the optical waveguide can be irradiated in a range in which the laser beam has a high energy density and a small change in energy. In this manner, a change in refractive index efficiently caused by reducing an amplitude error.

According to the method of manufacturing a grating, since a laser beam is irradiated while locally cooling a portion on which the laser beam is irradiated in the optical waveguide, local thermal expansion caused by local heating of the optical waveguide is suppressed, and distortion of a grating pitch can be suppressed by reducing a phase error.

Furthermore, according to the method of manufacturing a grating of the present invention, since laser beam is irradiated while cooling an optical waveguide by an air cooling method, local thermal expansion caused by local heating of the optical waveguide is suppressed, and distortion of a grating pitch can be suppressed by reducing a phase error.

BRIEF DESCRIPTION OF THE DRAWINGS

FIG. 2A is a sectional view of the optical waveguide along a line IIA—IIA in FIG. 1, and FIG. 2B is a sectional view of the optical waveguide along a line IIB—IIB in FIG. 1;

DETAILED DESCRIPTION OF THE INVENTION

Figure 1:
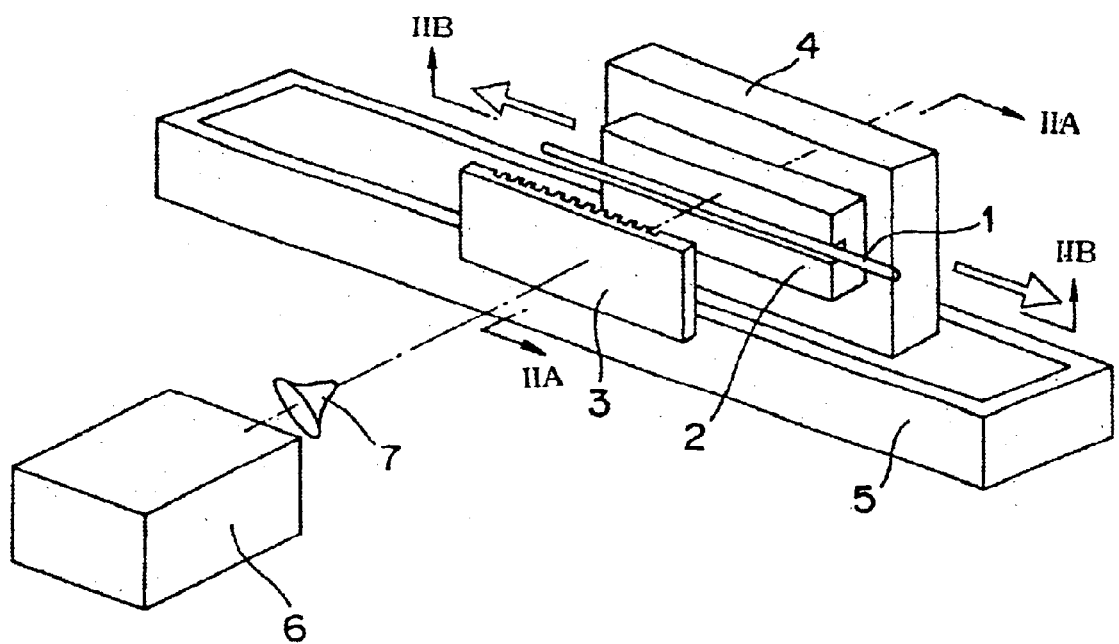
FIG. 1 is a perspective view showing a positional relationship between an optical waveguide and an optical system in a method of manufacturing a grating of the first embodiment 1 of the present invention.

A method of manufacturing a grating according to an embodiment of the present invention will be described below with reference to the accompanying drawings. The same reference numerals as in the accompanying drawings denote the same parts in the accompanying drawings. In the first aspect of the method of manufacturing a grating according to the embodiment of the present invention, a scanning speed of an ultraviolet laser beam is controlled to suppress distortion of a grating pitch generated by thermal expansion caused by local heating of an optical waveguide. More specifically, the ultraviolet laser beam is scanned along the optical axis of the optical waveguide at a scanning speed which is equal to or higher than a predetermined scanning speed. The scanning speed may be defined by an energy density E and a beam diameter B per unit time of an ultraviolet laser beam. When the ultraviolet laser beam is scanned at the scanning speed which is equal to or higher than the predetermined speed, local thermal expansion occurring in a beam end of the ultraviolet laser beam can be suppressed, and distortion of the pitch of a grating to be formed can be suppressed.

In the second aspect in the method of manufacturing a grating according to the embodiment of the present invention, an irradiation range of an ultraviolet laser beam is controlled, and scanning is performed a plurality of times to manufacture a grating. When the irradiation range of the ultraviolet laser beam is controlled, a predetermined distribution of irradiation amount can be obtained. In addition, since scanning is performed a plurality of times, an irradiation amount per scanning can be reduced. As a result, local thermal expansion can be suppressed, distortion of a grating pitch can be suppressed.

In the third aspect in the method of manufacturing a grating according to the embodiment of the present invention, an optical waveguide is arranged on a mirror surface substrate, a reflected beam of the ultraviolet laser beam reflected by the mirror surface substrate is monitored to align the ultraviolet laser beam and the optical waveguide to each other. In this manner, the optical waveguide can be irradiated within a range in which the energy density of the ultraviolet laser beam is highest and a change in energy is small. Therefore, an amplitude error can be reduced.

In the fourth aspect in the method of manufacturing a grating according to the embodiment of the present invention, a portion on which an ultraviolet laser beam is scanned in an optical waveguide is locally cooled. In this manner, local thermal expansion is suppressed, and an error of a grating pitch, i.e., distortion is suppressed.

In a method of manufacturing a grating according to the first embodiment of the present invention, a scanning speed of an ultraviolet laser beam is controlled to suppress distortion of a grating pitch generated by thermal expansion caused by local heating of an optical waveguide. More specifically, the ultraviolet laser beam is scanned along the optical axis of an optical waveguide at a predetermined scanning speed. The scanning speed may be equal to or higher than a scanning speed defined by an energy density E and a beam diameter B per unit time of an ultraviolet laser beam. When the ultraviolet laser beam is scanned at the scanning speed which is equal to or higher than the predetermined speed, local thermal expansion occurring in an irradiated portion of the ultraviolet laser beam, and distortion of the pitch of a grating to be formed can be suppressed.

A method of manufacturing a grating will be briefly described. In this method of manufacturing a grating, as shown in the perspective view in FIG. 1, an optical fiber 1 is used an optical waveguide. The optical fiber 1 is fitted in a groove formed in a substrate 2, and an ultraviolet laser beam 7 is scanned in a direction, which is almost perpendicular to the optical axis of the optical fiber 1. A mechanism for manufacturing the grating is as follows. When the ultraviolet laser beam 7 is irradiated on the optical fiber 1 through a phase mask 3, as shown in the sectional view in the direction of the optical axis in FIG. 2B, the ultraviolet laser beam 7 is mainly diffracted into ±1-order diffraction light components 23 and 24 by the phase mask 3, and the +1-order diffraction light component 23 and the −1-order diffraction light component 24 are interfered with each other to form interference fringes. When the interference fringes are irradiated on the optical fiber 1, a change in refractive index of the interference fringes depending on the energy intensity of the ultraviolet laser beam occurs, and a grating 20 is manufactured in a core 21 of the optical fiber 1. The pitch of the grating 20 formed at this time is about half the pitch of the phase mask. The pitch of a grating for optical communication in a 1.55-$\mu$m band is about 500 nm.

The scanning of the ultraviolet laser beam 7 is performed such that a moving stage 5 holding the optical fiber 1, the substrate 2 and the phase mask 3 with a holder 4 is relatively moved with respect to the ultraviolet laser beam 7. When the moving stage 5 is moved, the optical fiber 1, the substrate 2, and the phase mask 3 held on the moving stage 5 can be moved on the left and the right. The moving stage 5 may be controlled by a controller such as a personal computer (not shown). When the moving stage 5 is moved in the direction of the optical axis of the optical fiber 1, the optical fiber 1, the substrate 2, and the phase mask 3 move, and a position on which the ultraviolet laser beam 7 is irradiated can be moved along the optical axis of the optical fiber 1. When the ultraviolet laser beam 7 is irradiated on the core 21 of the optical fiber 1, a grating is manufactured along the optical axis of the optical fiber 1. At this time, the moving stage 5 is moved at a predetermined scanning speed, so that a local increase in temperature of the optical fiber 1 caused by irradiation of the ultraviolet laser beam 7 can be suppressed. In this manner, when the ultraviolet laser beam 7 is scanned at the scanning speed which is equal to or higher than the predetermined scanning speed, local thermal expansion of the optical fiber 1 can be suppressed, and a precise grating can be manufactured. Detailed conditions of the scanning speed will be described later.

The constituent elements of the peripheral portion of the optical fiber 1 serving as an optical waveguide and the optical system for scanning an ultraviolet laser beam will be described below. The optical fiber 1 is constituted by the core 21 consisting of a material having the refractive index that is changeable with ultraviolet light, and a cladding covering the core 21. A groove having a width which is slightly larger than the diameter of the optical fiber 1 is formed in the substrate 2, and the optical fiber 1 is put in the groove. As the substrate 2, a substrate consisting of a material, e.g., a semiconductor such as Si or a metal such as Au or Ag which has a high thermal conductivity is preferably used. The phase mask 3 for manufacturing a grating in the optical fiber 1 is disposed close to the optical fiber 1 and the substrate 2. In order to make it easy to understand the respective structures in FIG. 1, the phase mask 3 is spaced apart from the optical fiber 1 and the substrate 2 in FIG. 1.

However, actually, as shown in the sectional view along line IIA—IIA in FIG. 1, in FIG. 2A, and the sectional view along a line IIB—IIB in FIG. 1, in FIG. 2B, the phase mask 3 is disposed close to the optical fiber 1 and the substrate 2. The optical fiber 1, the substrate 2, and the phase mask 3 are fixed to each other such that the positional relationship of the components do not change. In addition, the optical fiber 1, the substrate 2, and the phase mask 3 are installed on the moving stage 5 with the holder 4. By the moving stage 5, the optical fiber 1, the substrate 2, and the phase mask 3 can be moved to the left and the right. In this method of manufacturing a grating, an optical fiber is used as the optical waveguide. However, the method of manufacturing a grating is not limited to the optical fiber, a planar lightwave circuit (PLC) can also be used.

In addition, constituent elements of an optical system for scanning an ultraviolet laser beam will be described below. The ultraviolet laser beam 7, as shown in the perspective view in FIG. 1, is output from an ultraviolet laser device 6. In the ultraviolet laser device 6, a laser beam of pulse oscillation excited by a semiconductor light source such as a light-emitting diode (LED) or a laser diode (LD) is converted with respect to wavelength to output an ultraviolet laser beam having a beam diameter of about 1 mm. As the ultraviolet laser beam 7, a third harmonic (wavelength of 355 nm), a fourth harmonic (wavelength of 266 nm), and a fifth harmonic (wavelength of 213 nm) of an Nd-YAG laser excited by a semiconductor light source can be used.

Detailed conditions related to a scanning speed of an ultraviolet laser beam will be described below. Time required for a local increase in temperature occurring in the optical fiber 1 and caused by irradiation of the ultraviolet laser beam will be described below. An irradiation time for which an increase in temperature of the optical fiber 1 is 1° C. or less, for example, is about 0.35 seconds in case of a silica substrate, is about 0.5 seconds in case of an Si substrate, and is about 0.75 seconds in case of an Au substrate according to the transition characteristic of an increase in temperature of the optical fiber with respect to an irradiation time of an ultraviolet laser beam in which an energy density E per unit time is 100 W/cm². The local increase in temperature of the optical fiber 1 is preferably set as small as possible. When the local increase in temperature is about 1° C. or less, a change in grating pitch caused by local thermal expansion is 1 nm or less (0.2% or less), and degradation of the grating characteristic caused by the change in the grating pitch can be almost neglected. Therefore, when an ultraviolet laser beam having an energy density E of 100 W/cm² per unit time is used, if the irradiation time is 0.35 seconds or less in a silica substrate, a local increase in temperature of the optical fiber can be 1° C. or less. When the optical fiber 1 is installed on a substrate having thermal conductivity lower than that of silica, heat generated by irradiation of the laser beam is transmitted to the periphery through the optical fiber. For this reason, an increase in temperature is almost equal to the increase in temperature obtained when an optical fiber is installed in a silica substrate.

Figure 4:
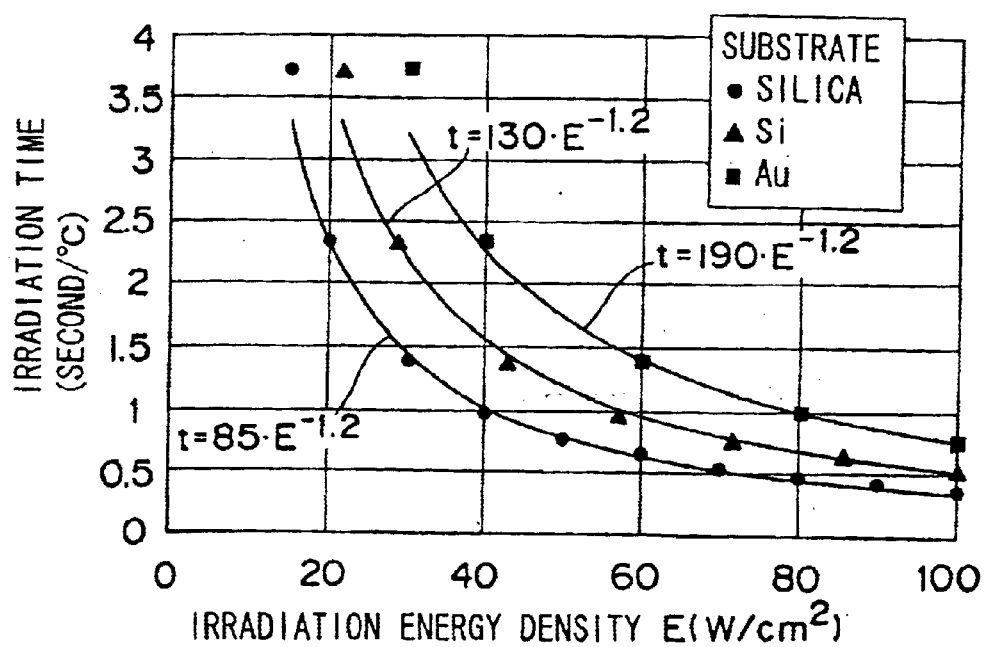
FIG. 4 is a graph showing the relationship between an irradiation energy density and an irradiation time at which the temperatures of optical fibers increases by 1° C. when an ultraviolet laser beam is irradiated on the optical fibers arranged on substrates having different thermal conductivity.

In addition, an irradiation time for which an increase in temperature of an optical fiber with respect to an irradiation energy density per unit time of an ultraviolet laser beam is 1° C., as shown in FIG. 4, is sharply shortened when an irradiation energy density per unit time increases. The irradiation energy density E (W/cm²) per unit and irradiation time t (second) for which an increase in temperature is 1° C., as indicated by curves in FIG. 4, are expressed by approximate equations of Equation 2, Equation 3, and Equation 4, respectively.

[Equation 2]

$$t=85 \cdot E^{-1.2} \text{ (silica substrate)} \quad (2)$$

[Equation 3]

$$t=130 \cdot E^{-1.2} \text{ (Si substrate)} \quad (3)$$

[Equation 4]

$$t=190 \cdot E^{-1.2} \text{ (Au substrate)} \quad (4)$$

Therefore, when irradiation times are equal or shorter than irradiation times expressed by Equation 2, Equation 3, and Equation 4 in various substrates, respectively, local increases in temperature of the optical fibers can be suppressed to 1° C. or less, and a change in grating pitch caused by local thermal expansion can be set at 1 nm or less. As described above, when a substrate having thermal conductivity lower than that of a silica substrate is used, the substrate can be treated like the silica substrate. For this reason, in a substrate having any material (including a case in which an optical fiber is set in the air), when the moving stage is moved at a speed which satisfies the condition that the irradiation time of the ultraviolet laser beam is:

$$t \leq 85 \cdot E^{-1.2},$$

a change in grating pitch caused by local thermal expansion can be set at 1 nm or less.

Although the ultraviolet laser beam having a beam diameter of 1 mm has been described, in general, when a grating is manufactured by using an ultraviolet laser beam having a beam diameter B (mm), irradiation continues from one end of the beam diameter to the other end during the scanning. The irradiation time of the beam end in this case is obtained by dividing the beam diameter B by a scanning speed v:

$$B/v \leq 85 \cdot E^{-1.2}$$

This equation is converted into an equation expressing the scanning speed v,
[Equation 5]

$$v \geq B/(85 \cdot E^{-1.2}) \text{(mm/second)} \quad (5)$$

When an ultraviolet laser beam is irradiated at a scanning speed which satisfies Equation 5, the irradiation time from one end of the beam diameter to the other end falls within a range an increase in temperature can be suppressed to 1° C. or less. For this reason, local thermal expansion can be suppressed. Therefore, it is preferable that the ultraviolet laser beam is irradiated at the scanning speed which satisfies the condition expressed by Equation 5.

Figure 16A:
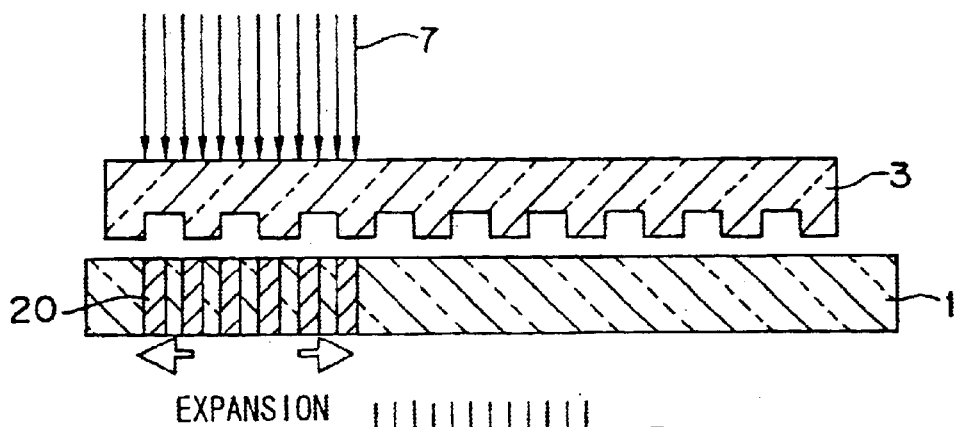
FIG. 16A is a conceptual diagram showing a manner in which an irradiated portion is expanded by scanning an ultraviolet laser beam having a beam diameter B at first position.
Figure 16B:
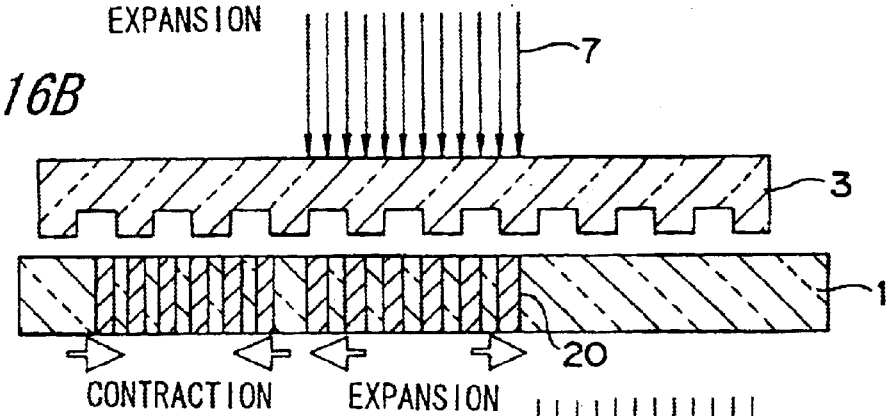
FIG. 16B is a conceptual diagram that the laser beam is scanned at second position.
Figure 16C:
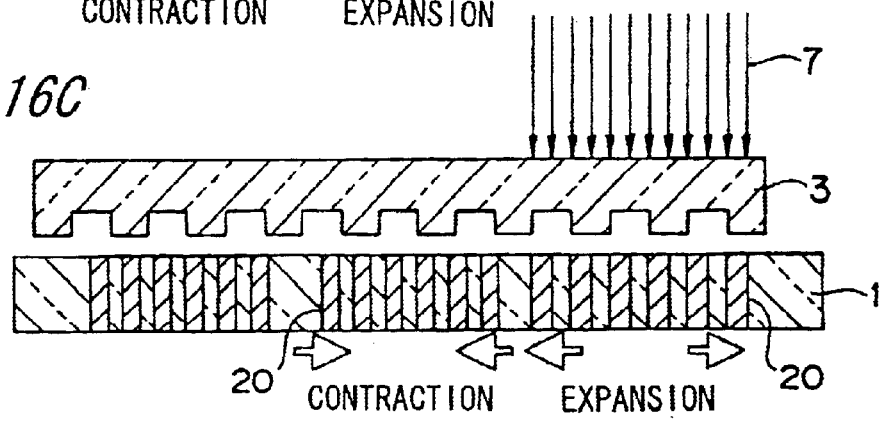
FIG. 16C is a conceptual diagram that the laser beam is scanned at third position.
Figure 17:
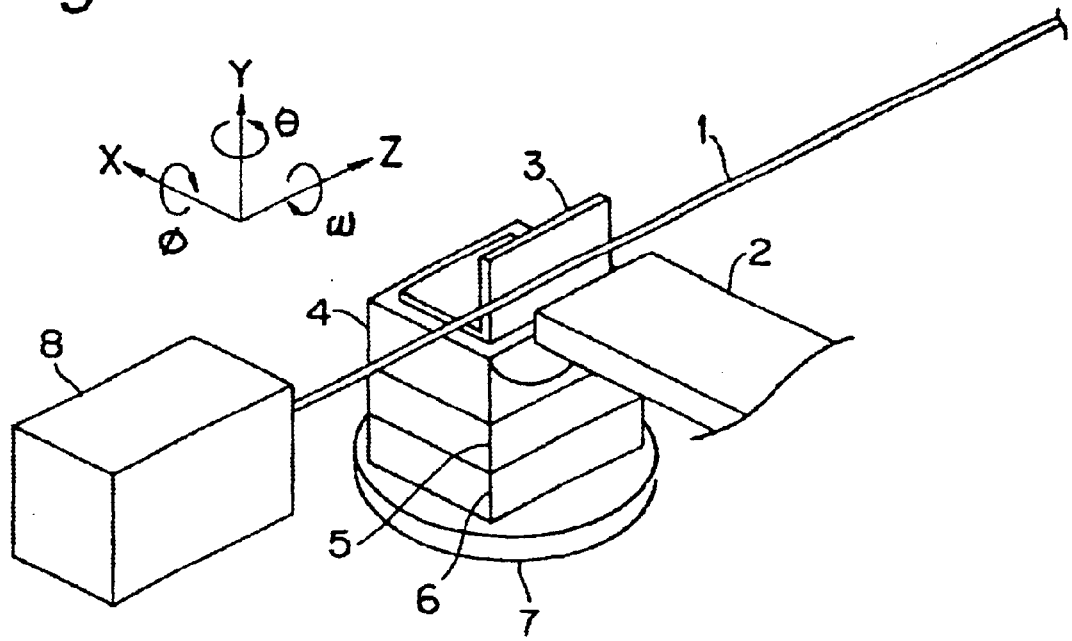
FIG. 17 is a diagram showing an example of a prior art method of manufacturing a grating.
Figure 18:
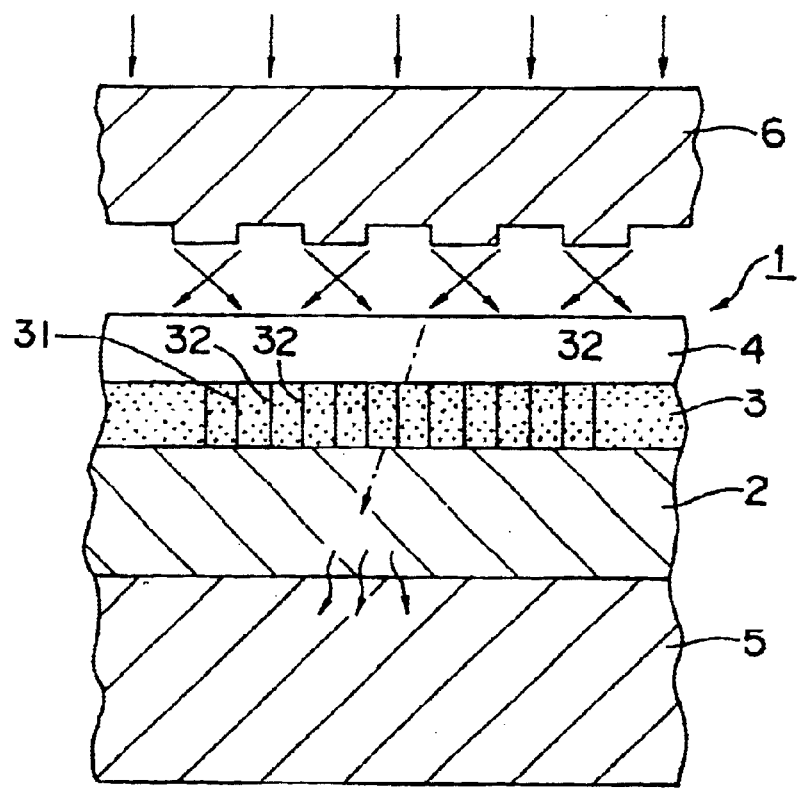
FIG. 18 is a diagram showing an example of a prior art method of manufacturing a grating.

In addition, as shown in FIG. 16, a beam having a beam diameter B (mm) is irradiated for a predetermined period of time, thermal expansion accumulated at the beam end is larger than that at the beam center. For this reason, even though an irradiation time does not change, an error from an original position caused by thermal expansion at the beam end is increased as the beam diameter increases. For example, as shown in FIG. 16A, an ultraviolet laser beam is irradiated on a first position, the optical waveguide at the irradiated portion thermally expands along the optical axis. As shown in FIGS. 16B and 16C, the ultraviolet laser beam moves to the next position, the portion which is irradiated at the first time is cooled to be contracted, and the portion which is irradiated next thermally expands. In this case, when an ultraviolet laser beam having a beam diameter B (mm) is scanned, even though an irradiation time t for which thermal expansion is generally 1 nm per unit length, e.g. per 1 mm, thermal expansion of the beam end may be accumulated to be about B (nm). Therefore, in order to suppress the thermal expansion at the beam end to 1 nm or less, a condition:

$$B/v \leq (85 \cdot E^{-1.2})/B$$

should be satisfied. According to this equation, when the scanning speed v is calculated, the following equation is obtained:
[Equation 6]

$$v \geq B^2/(85 \cdot E^{-1.2}) \quad (6)$$

When the ultraviolet laser beam is scanned at a scanning speed which satisfies Equation 6, even in step scanning in which the beam is irradiated on a predetermined position for predetermined period of time to move the beam to every other positions, the thermal expansion at the beam end can be suppressed to 1 nm or less. Therefore, it is more preferably that the ultraviolet laser beam is scanned at the scanning speed v (mm/second) which satisfies Equation 6.

When an Si substrate is used, scanning is performed at a scanning speed which satisfies the following Equation 7:
[Equation 7]

$$v \geq B^2/(130 \cdot E^{-1.2}) \quad (7)$$

In addition, when an Au substrate is used, the ultraviolet laser beam is preferably scanned at a scanning speed which satisfies the following Equation 8:
[Equation 7]

$$v \geq B^2/(190 \cdot E^{-1.2}) \quad (8)$$

Furthermore, according to Equation 7 and Equation 8, when a substrate consisting of a material such as a semiconductor or a metal having a high thermal conductivity is used, and when the thermal conductivity of the material is represented by k (W/(m·K)), the ultraviolet laser beam is preferably scanned at a scanning speed which satisfies the following Equation 9:
[Equation 9]

$$v \geq B^2/\{(115 \cdot k)^{1/2} \cdot E^{-1.2}\} \quad (9)$$

The beam diameter is the diameter or width of the laser beam the energy density of which is half the maximum value in a spatial energy distribution of the laser beam.

In order to suppress an increase in temperature caused by irradiation of an ultraviolet laser beam in manufacturing a grating, as described above, in addition to the method of moving the relative positions of the ultraviolet laser beam and an optical waveguide at a high speed to shorten irradiation time, a method of decreasing irradiation energy density per unit time of the ultraviolet laser beam is known. However, when irradiation energy density per unit time is decreased, an excessive irradiation time is required to alter the magnitude of the refractive index sufficiently (modulate the refractive index sufficiently). In other words, a required condition is that the refractive index be sufficiently changed without lengthening the irradiation time.

As such a condition, an ultraviolet laser beam of pulse oscillation is more effective than an ultraviolet laser beam of continuous oscillation used in a second harmonic (wavelength: 244 nm) of an Ar laser conventionally used for manufacturing a precise grating. Especially, an ultraviolet laser beam excited by a semiconductor light source is good in time stability and space stability of energy, and is most suitable. As the ultraviolet laser beams of pulse oscillation, the third harmonic (wavelength: 355 nm), the fourth harmonic (wavelength: 266 nm), and the fifth harmonic (wavelength: 213 nm) of an Nd-YAG laser excited by a semiconductor light source are preferably used. Especially, the fourth harmonic (wavelength: 266 nm) has a wavelength which is approximate to the wavelength of the second harmonic (wavelength: 244 nm) of an Ar laser or a KrF excimer laser (wavelength: 248 nm). Since optical components such as a phase mask are directly used, the ultraviolet laser beam of pulse oscillation is advantageous with respect to a reduction in cost of the optical components.

In addition, as an ultraviolet laser beam of pulse oscillation used for manufacturing a grating, an ultraviolet laser beam having an energy density, which is equal to or higher than the predetermined energy density at a change point, is preferably used. At the change point, an inclination of the degree of refractive index modulation to the energy density, which is relationship between the degree of refractive index modulation and the energy density, changes. Using an ultraviolet laser beam having an energy density which is equal to or higher than the predetermined energy density, the inclination of the degree of refractive index modulation to the energy density is more increased. For this reason, even if an ultraviolet laser beam having an energy density per unit area either lower or higher than the predetermined energy density per unit area at the change point is controlled to equal energy density per unit time by adjusting oscillation frequencies, with respect to the degree of refractive index modulation due to the irradiation of the ultraviolet laser beam, the ultraviolet laser beam having the energy density, which is equal to or higher than the predetermined energy density at the change point, is more preferable than the energy density which is lower than the predetermined energy density.

Figure 5:
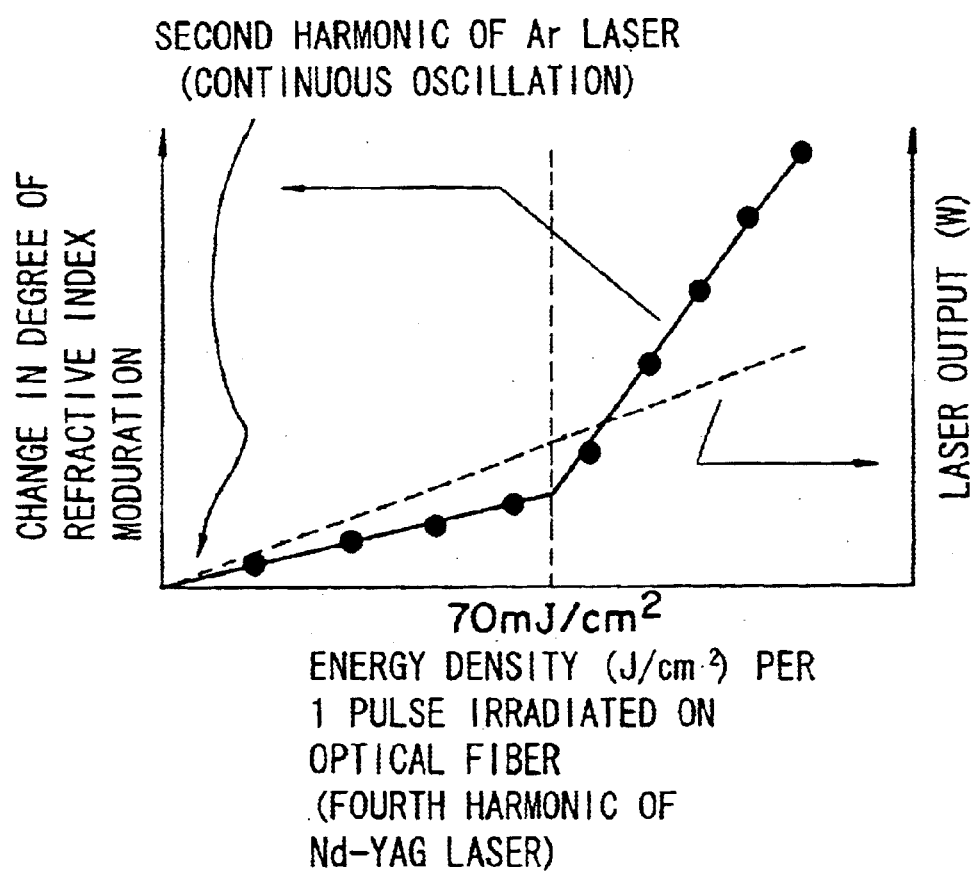
FIG. 5 is a graph showing the relationship between an energy density per pulse and a change in degree of refractive index modulation when an ultraviolet laser beam is irradiated on an optical fiber for a predetermined period of time.

The relationship between the degree of refractive index modulation and the energy density will be described below. FIG. 5 shows, when a grating is manufactured by using the fourth harmonic (wavelength: 266 nm) of an Nd-YAG laser of pulse oscillation excited by a semiconductor light source, the relationship between an energy density per pulse of an ultraviolet laser beam irradiated on an optical waveguide and the degree of refractive index modulation of the grating to be manufactured. As the optical waveguide, a dispersion shift single-mode optical fiber having a zero dispersion wavelength in a 1.5-μm band is used. In this case, it is noted that the oscillation frequency of the laser is kept at a constant value, i.e., 200 Hz, and that time for which the ultraviolet pulse laser beam is irradiated is constant. In FIG. 5, an energy density per unit time to an energy density per pulse, i.e., a laser output is indicated by a dotted line. This laser output (unit: W) is a product of an energy (unit: J) per pulse and an oscillation frequency (unit: Hz), and, as shown in FIG. 5, is in proportion to the energy density per pulse. On the other hand, the inclination of the magnitude of the change of the degree of refractive index modulation increases when the energy density per pulse of the ultraviolet laser beam irradiated on the optical waveguide is 70 mJ/cm² (change point). More specifically, the energy density of one pulse is 70 mJ/cm² or more, the degree of refractive index modulation changes at a rate which is equal to or higher than an increase rate of the laser output.

In addition, when a single-mode optical fiber having a zero dispersion wavelength in a 1.3-μm band is used as another optical fiber, the inclination sharply changes (not shown) when the energy density per pulse of the ultraviolet pulse laser beam is 100 mJ/m² (change point). In a planar lightwave circuit (PLC) in which the sensitivity of ultraviolet light is improved by adding Ge and Sn to the core 21, the inclination increases (not shown) at 50 mJ/cm$^2$ (change point). More specifically, a phenomenon in which an energy density at which a change in refractive index sharply changes with respect to the energy density per pulse of the ultraviolet pulse laser beam irradiated on the optical waveguide exists similarly occurs in optical waveguides of different types although the energy densities at the change points of the optical waveguides are different from each other. The cause of the phenomenon is not known. However, in order to efficiently change a refractive index by irradiation of an ultraviolet laser beam, an optical energy which is large to some extent may be required for an extremely short time. Therefore, since an ultraviolet laser beam of continuous oscillation such as the second harmonic (wavelength: 244 nm) of an Ar laser cannot supply a sufficient large optical energy for an extremely short time, a refractive index is not efficiently changed by irradiation of an ultraviolet laser beam.

When an ultraviolet pulse laser beam is irradiated, the ultraviolet pulse laser beam having an energy density which is equal to or higher than the predetermined energy density at the change point is preferably irradiated on the core 21 of the optical waveguide. At the change point, a change in refractive index sharply increases with respect to an energy density per pulse. For example, when a dispersion shift single-mode optical fiber having a zero dispersion wavelength in a 1.55-$\mu$m band is used, as shown in FIG. 5, in an ultraviolet pulse laser beam irradiated on the core 21 of the optical waveguide and having an energy density per pulse of 100 mJ/cm$^2$ and an oscillation frequency of 200 Hz and an ultraviolet pulse laser beam irradiated on the core 21 of the optical waveguide and having an energy density per pulse of 50 mJ/cm$^2$ and an oscillation frequency of 400 Hz, energy densities per unit time irradiated on the core of the optical waveguide are 20 W/cm$^2$ each. In this case, calculation is performed on the basis of FIG. 5, the ultraviolet pulse laser beam having 100 mJ/cm$^2$ and 200 Hz can obtain the degree of refractive index modulation which is about twice that of the other ultraviolet pulse laser beam in the same irradiation time. On the other hand, the ultraviolet pulse laser beam having 50 mJ/cm$^2$ and 400 Hz requires about twice irradiation time to obtain the same degree of modulation. In addition, in order to obtain the same degree of refractive index modulation as that of the ultraviolet pulse laser beam having an energy density of 100 mJ/cm$^2$ and an oscillation frequency of 200 Hz by the ultraviolet pulse laser beam having an energy density of 50 mJ/cm$^2$ for the same irradiation time, an oscillation frequency must be 800 Hz. However, in this configuration, an energy density per unit time becomes 40 W/cm$^2$, and a twice power is required. Furthermore, a local increase in temperature of the optical waveguide becomes large.

In order to prevent the local increase in temperature of the optical waveguide, the ultraviolet laser beam described above should be relatively moved at a high speed with respect to the optical waveguide. According to Equation 4, an ultraviolet pulse laser beam having 100 mJ/cm$^{2, 200}$ Hz, and 20 W/cm$^2$ may be scanned at a scanning speed of about 0.43 mm/second or more. An ultraviolet pulse laser beam having 50 mJ/cm$^{2, 800}$ Hz, and 40 W/cm$^2$ should be scanned at a scanning speed of about 0.98 mm/second or more. Since an allowable width of the scanning speed increases, an ultraviolet laser beam having an energy density per pulse which irradiated on the core of the optical waveguide and which is 70 mJ/cm$^2$ or more is advantageously used. For this reason, an Nd-YAG laser excited by a semiconductor light source is preferable to manufacture the grating. The Nd-YAG laser excited by the semiconductor light source is good in time stability and space stability of a laser beam. Since the efficiency of a change in refractive index of the Nd-YAG laser is better than the efficiency of a change in refractive index of the second harmonic or the like of the Ar laser, the Nd-YAG laser is maximally suitable for manufacturing a precise grating.

Also, a KrF excimer laser is an ultraviolet pulse laser beam, and the same conditions as described above are satisfied. However, since the KrF excimer laser is no good in time stability and space stability of the laser beam, the manufactured grating has a large amplitude error, and the level of the grating does not reach the level at which the fluctuation of about 1 nm of the grating pitch can be examined. Although an Nd-YAG laser excited by a discharge lamp also exists, this Nd-YAG laser is not suitable for manufacturing a precise grating for the same reason as that of the KrF excimer laser.

In addition, in the description of the method of manufacturing a grating, the light source of an ultraviolet laser beam is fixed to a predetermined position, and the optical fiber 1 is moved by the moving stage 5 to change the relative positions of the optical fiber 1 and the ultraviolet laser beam 7, so that the ultraviolet laser beam is scanned. However, a method of scanning an ultraviolet laser beam is not limited to the above method. In contrast to this, an optical fiber may be fixed to a predetermined position, and the ultraviolet laser beam may be moved to scan the ultraviolet laser beam. More specifically, any configuration in which an optical fiber and the irradiation position of an ultraviolet laser beam relatively change may be used.

In addition, the optical waveguide 1 serving as an optical fiber for manufacturing a grating is preferably fitted in a groove formed in the substrate 2 having a high thermal conductivity. As the substrate 2 having a high thermal conductivity, a substrate having thermal conductivity higher than the thermal conductivity of a material constituting the optical waveguide 1 is preferably used. More specifically, the substrate 2 preferably has thermal conductivity of 1 W/(m·k) or more. Since the optical waveguide 1 is fitted in the groove of the substrate 2 having high thermal conductivity, heat generated by a portion on which the ultraviolet laser beam 7 is irradiated is diffused to the substrate 2, and a local increase in temperature of the portion can be prevented. When the local heating of the optical waveguide 1 is suppressed as described above, a grating in which local thermal expansion is prevented and grating pitches are defined can be manufactured.

Figure 3:
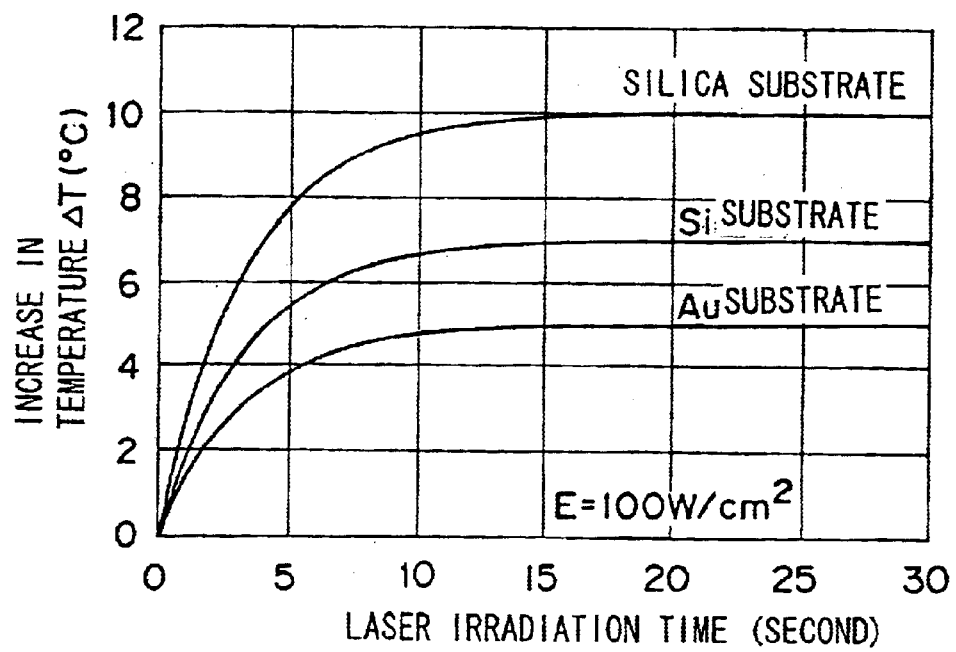
FIG. 3 is a graph showing the relationship between a laser irradiation time and increased temperatures of optical fibers when an ultraviolet laser beam is irradiated on the optical fibers arranged on substrates having different thermal conductivity.

In the method of manufacturing a grating, in order to suppress a local increase in temperature of the optical fiber 1, detailed conditions related to a substrate for storing the optical fiber 1 will be described below. When an ultraviolet laser beam is irradiated on the optical fiber, the temperature increases. More specifically, when the ultraviolet laser beam 7 having a beam diameter of 1 mm is irradiated on the optical fiber 1 such that the moving stage 5 is stopped without being moved, as shown in FIG. 3, in the relationship between an increase in temperature ΔT of the optical fiber 1 and the irradiation time of the laser beam, the temperature almost linearly increases from the start of irradiation to the elapse of about 5 seconds. Thereafter, the increase in temperature is saturated. The ultraviolet laser beam 7 used in measurement is an ultraviolet laser beam of pulse oscillation, has an energy distribution of a Gaussian distribution type, and has an energy per pulse of 1 mJ. For this reason, at the irradiation portion of the optical fiber 1, the energy density per pulse of the ultraviolet laser beam 7 is about 200 mJ/cm². When the ultraviolet laser beam 7 is irradiated on the optical fiber 1 at an oscillation frequency of 500 Hz, an energy density E per unit time irradiated on the optical fiber is 100 W/cm². When the optical fiber was arranged on a silica substrate, an increase in temperature ΔT was about 10° C. according to FIG. 3. When a Si substrate was used, the increase in temperature ΔT was about 7° C.; and when an Au substrate was used, the increase in temperature ΔT was about 5° C. In this manner, when an optical fiber is arranged on a metal or semiconductor substrate having a high thermal conductivity, a local increase in temperature of the optical fiber can be suppressed to be small.

As the method of manufacturing a grating, the method of manufacturing a grating such that interference fringes of an ultraviolet laser beam are formed by using a phase mask has been described above. The method of the embodiment is not limited to the method described above. A method of manufacturing a grating such that interference fringes are formed by a two-beam interference method of splitting an ultraviolet laser beam into two-beam by a half mirror and joining the two-beam on an optical waveguide to form interference fringes, a prism interference method of forming interference fringes by using a prism, or another method may also be used.

In a method of manufacturing a grating of the second embodiment of the present invention, an irradiation range of an ultraviolet laser beam is controlled in a core constituting a grating to scan the ultraviolet laser beam. In this manner, when the irradiation range of the ultraviolet laser beam is controlled, a distribution can be adjusted to the distribution of a predetermined degree of refractive index modulation. In the method of manufacturing a grating, the ultraviolet laser beam is scanned a plurality of times to form refractive index modulation. When scanning is performed the plurality of times, a local increase in temperature occurring when refractive index modulation is formed by performing irradiation once and local thermal expansion caused by the local increase in temperature can be avoided. In this manner, when the degree of refractive index modulation having a predetermined distribution is obtained, a precise grating can be formed.

The method of manufacturing a grating differs from the method of manufacturing a grating of the first embodiment in that the irradiation range of an ultraviolet laser beam is controlled and that scanning is performed a plurality of times. The irradiation range of the ultraviolet laser beam is controlled to obtain a predetermined distribution of irradiation amount of ultraviolet beam, i.e., a distribution of a predetermined degree of refractive index modulation. Apodization which forms the distribution of the predetermined degree of refractive index modulation is necessary to increase an amount of out-of-band attenuation of a band-pass filter or to decrease a group delay ripple of a dispersion equalization device in a grating device generally used in an optical communication system. As this apodization, apodizations of various function types such as a Gaussian distribution type, a cosine function type, and a sinc function type which conform with applications are employed. In the method of manufacturing a grating, a case in which an ultraviolet laser beam is scanned along the optical axis of an optical waveguide to perform apodization will be described below.

Figure 6A:
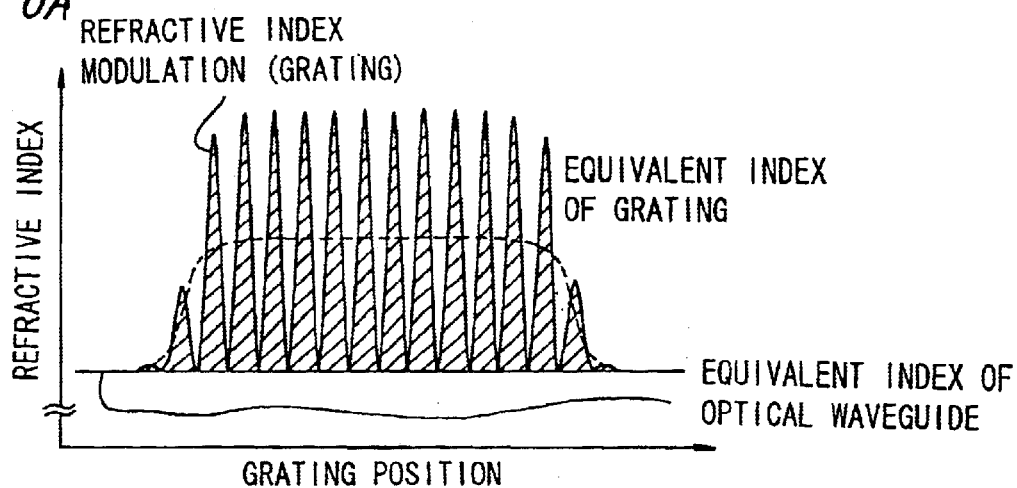
FIG. 6A is a conceptual diagram showing the relationship between a grating and an equivalent refractive index in procedures for manufacturing a grating subjected to apodization on an optical waveguide in a method of manufacturing a grating of the second embodiment of the present invention.
Figure 6B:
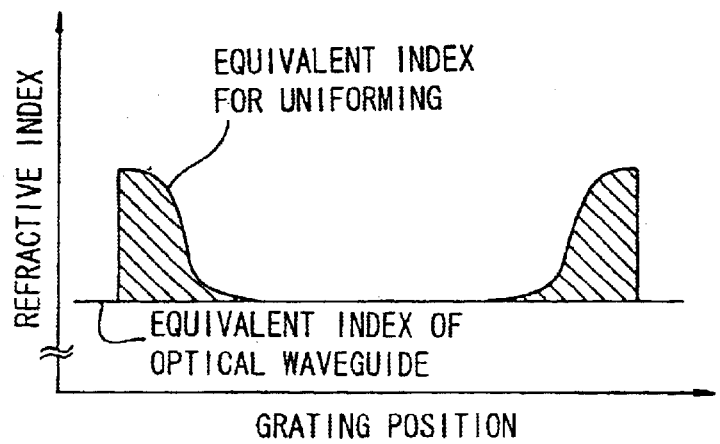
FIG. 6B is a conceptual diagram of a distribution of change in refractive index given in an equivalent refractive index uniforming process performed to make the equivalent refractive index of the grating constant.
Figure 6C:
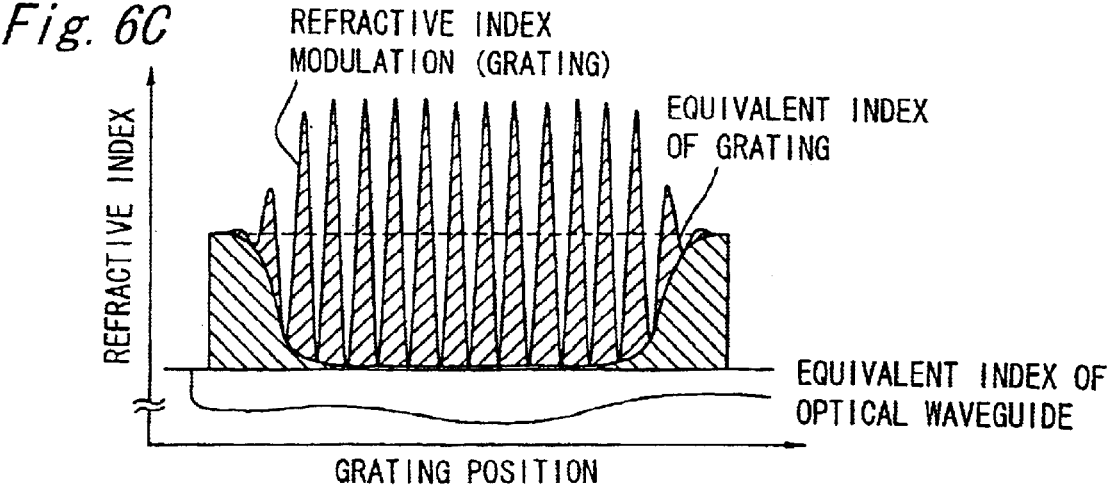
FIG. 6C is a conceptual diagram showing a state in which the equivalent refractive index of the grating is uniformed.

For example, in a method of manufacturing a grating in which refractive index modulation of a sinc type function (sinc function: sinc(x)=sin(x)/x) is performed as apodization, as shown in FIG. 6, the refractive index modulation is given by two-step. More specifically, a refractive index modulation for a grating is given (a), a process of uniforming an equivalent refractive index (b) is performed to form a grating (c). The manufacturing the grating can be performed by the same optical system as that described in the first embodiment. A phase mask 3 is made close to the optical waveguide 1 to irradiate an ultraviolet laser beam. At this time, in the direction of the optical axis of the optical waveguide, the ultraviolet laser beam is irradiated to have a predetermined distribution of irradiation amount. In FIG. 6A, a dotted line indicates "equivalent refractive index of grating". Since a change in refractive index corresponds to an irradiation amount, when the ultraviolet laser beam is irradiated to obtain a predetermined distribution of irradiation amount which causes the change in refractive index, refractive index modulation (grating) having a change in refractive index having the predetermined cycle is formed (FIG. 6A). An interval between the peaks of the refractive index is set to be about 500 nm in an optical communication system using a wavelength in a 1.55-μm band. On the other hand, a dotted line indicates the equivalent refractive index of a grating received by light propagated through the optical waveguide. The equivalent refractive index is required to be constant with respect to the entire grating. For this reason, thereafter, the process of uniforming the equivalent refractive index is performed (FIG. 6B). In the uniforming process, in the optical system in FIG. 1, the phase mask 3 is removed in the optical system in FIG. 1, and the ultraviolet laser beam is irradiated such that a distribution of irradiation amount as shown in FIG. 6B is obtained in the longitudinal direction of the grating manufactured by the method. As a result, as shown in FIG. 6C, an equivalent refractive index of a portion having a low degree of refractive index modulation increases, a constant equivalent refractive index is obtained as indicated by a dotted line in the entire grating. Even though the process of uniforming an equivalent refractive index and the forming a grating are performed in any order, the same distribution of irradiation amount shown in FIG. 6C can be finally obtained. For this reason, these operations in an order reverse to the above order.

Figure 7:
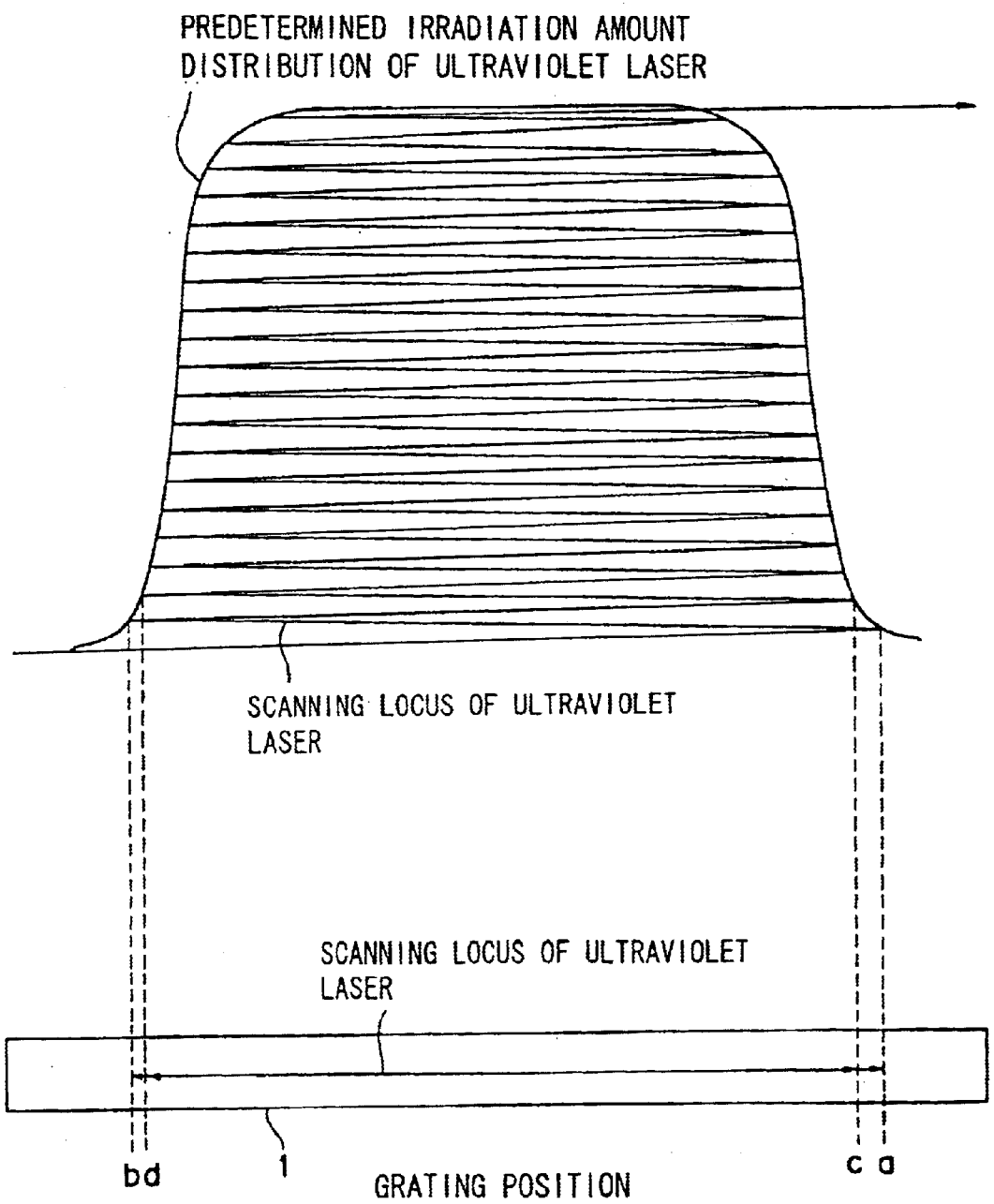
FIG. 7 is a conceptual diagram showing the relationship between a scanning locus of an ultraviolet laser beam and an accumulated distribution of irradiation amount in the method of manufacturing a grating of the second embodiment of the present invention.

A method of manufacturing a grating will be described below. Since a portion where a grating is formed is subjected to a distribution of irradiation amount of a sinc type function as apodization, as shown in FIG. 7, a scanning range of an ultraviolet laser beam is controlled to perform scanning. As an optical system on which an ultraviolet laser beam is irradiated, the optical system shown in FIG. 1 can be used. In this case, the scanning locus of the ultraviolet laser beam is conceptually shown by a broken line which moves from the lower left to the lower right as indicated by a in FIG. 7, reciprocates from the left to the right a plurality of times, and then reaches an upper right arrow. In addition, the following is conceptually shown. That is, an irradiation amount is accumulated such that scanning locus overlap, and a distribution of irradiation amount of an ultraviolet laser beam for apodization is obtained. A scanning locus corresponding to two reciprocations of the optical waveguide and the ultraviolet laser beam is shown in FIG. 7.

In addition, a method of controlling a scanning range of an ultraviolet laser beam in manufacturing the grating will be described below. As shown in FIG. 7, a irradiation range of the ultraviolet laser beam on the optical fiber is controlled by the irradiation position of the ultraviolet laser beam, so that an accumulated distribution of irradiation amount can be adjusted. More specifically, the ultraviolet laser beam is scanned from the left end at an almost constant scanning speed from the outside of the range in which the grating of the optical waveguide is manufactured. In the first half, irradiation is performed in a scanning range up to a position on the right. In the second half, irradiation is performed up to a position b on the left end. In the next reciprocation, the scanning range is narrowed to a position c on the right end, and the left end is defined by a position d. Subsequently, similarly, when the scanning range of the ultraviolet laser beam is gradually narrowed, a grating in which irradiation amounts of the ultraviolet laser beam are small at both the ends of the grating and large at the center of the grating is manufactured. When the scanning range of the ultraviolet laser beam is controlled as described above, the accumulated distribution of irradiation amount can be equal to the predetermined distribution of irradiation amount. Thereafter, the ultraviolet laser beam is moved out of the range in which the grating of the optical waveguide is manufactured to complete the manufacturing of the grating in the optical waveguide. Although not shown in FIG. 7, shielding is performed such that the ultraviolet laser beam is not irradiated on the optical waveguide except for the range in which the grating is manufactured.

The irradiation range of the ultraviolet laser beam is controlled as described above to adjust an accumulated ultraviolet beam distribution of irradiation amount, so that apodization can be performed. Since a predetermined distribution of irradiation amount is not obtained by performing irradiation once, but is obtained by an accumulated distribution of irradiation amount by performing ultraviolet laser beam irradiation a plurality of times, an irradiation amount used when irradiation is performed once can be reduced. For this reason, since a scanning speed can be increased, local heating caused by local irradiation of an optical fiber can be suppressed, and local thermal expansion can be suppressed.

Note that a scanning speed of an ultraviolet laser beam is preferably a scanning speed which satisfies Equation 5 described in the first embodiment. When the ultraviolet laser beam is scanned at the scanning speed which satisfies Equation 5, local thermal expansion can be suppressed to 1 nm or less. The scanning speed which satisfies Equation 6 is more preferable. When the ultraviolet laser beam is scanned at the scanning speed which satisfies 6, an error of a grating pitch generated by local thermal expansion caused by local heating of the optical waveguide can be made 1 nm or less. Furthermore, when the substrate on which the optical waveguide is arranged, the type of the ultraviolet laser beam, the irradiation energy density per pulse of the ultraviolet laser beam are made equal to those of the first embodiment, local thermal expansion caused by local heating of the ultraviolet laser beam can be more suppressed.

The irradiation energy intensity of the ultraviolet laser beam is preferably constant during scanning to achieve time stability of a laser output. When the ultraviolet laser beam is moved between both the ends of the grating, i.e., from the outside of the range in which the grating is manufactured into the range in which the grating is manufactured, and from the range in which the grating is manufactured to the outside of the range in which the grating is manufactured, adjustment may be performed such that the irradiation energy intensity of the ultraviolet laser beam is decreased. In order to make time stability of a laser output preferable, a laser device in which a laser is oscillated at a predetermined output before the ultraviolet laser beam is irradiated in the range in which the grating is manufactured to make the laser device thermally stable is preferably used. In this method of manufacturing a grating, since the ultraviolet laser beam is irradiated such that the ultraviolet laser beam is reciprocally scanned in the optical fiber, especially, the center of the optical fiber, a momentary fluctuation of the irradiation energy of the ultraviolet laser beam is canceled by integrated. Therefore, the influence of the momentary fluctuation of the irradiation energy can be reduced.

Since the optical system used in the method of manufacturing a grating is the optical system shown in FIG. 1, the following case has been described above. That is, the optical system moves through the optical waveguide with the moving stage, the ultraviolet laser beam is fixed to a predetermined position and scanned to be irradiated. However, the optical waveguide may be fixed to the predetermined position, and the ultraviolet laser beam may be moved and scanned to be irradiated. More specifically, any configuration in which the optical waveguide and the irradiation position of the ultraviolet laser beam relatively move may be used.

In a method of manufacturing a grating of the third embodiment of the present invention, an irradiation range of an ultraviolet laser beam is controlled by a moving light-shielding plate, and scanning is performed a plurality of time to form refractive index modulation. When the scanning range is controlled by the moving light-shielding plate, a fluctuation component of a scanning speed generated when the scanning direction of the ultraviolet laser beam is inverted can be removed.

Figure 8:
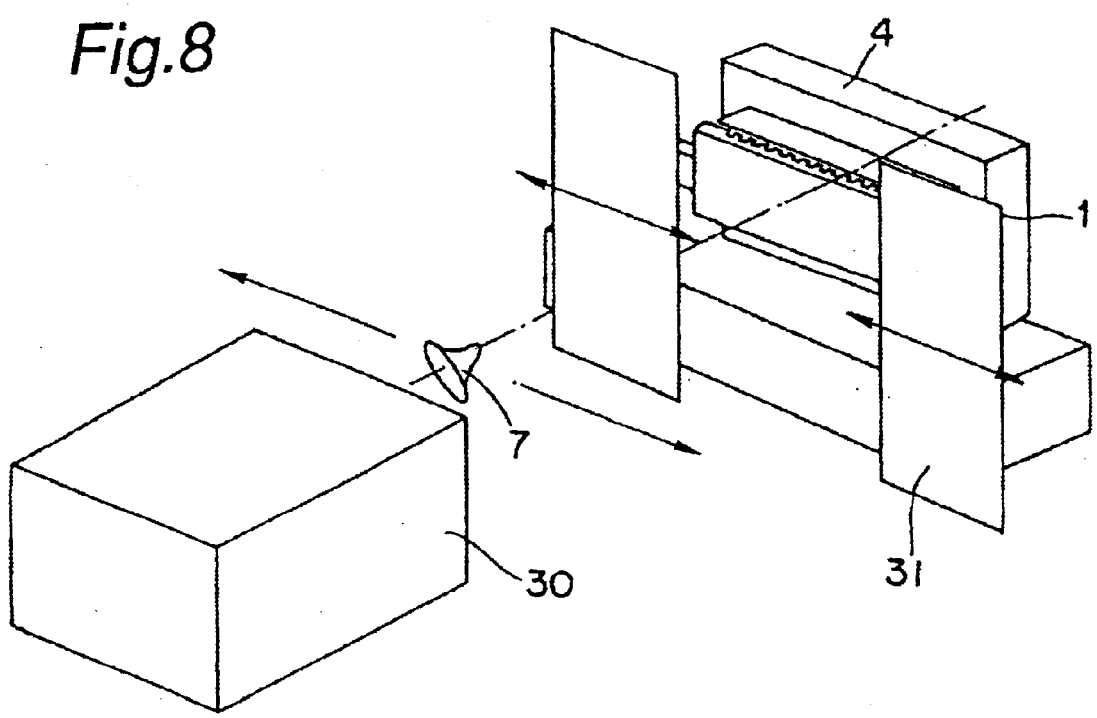
FIG. 8 is a perspective view showing the outline of a method of manufacturing a grating of the third embodiment of the present invention.
Figure 9:
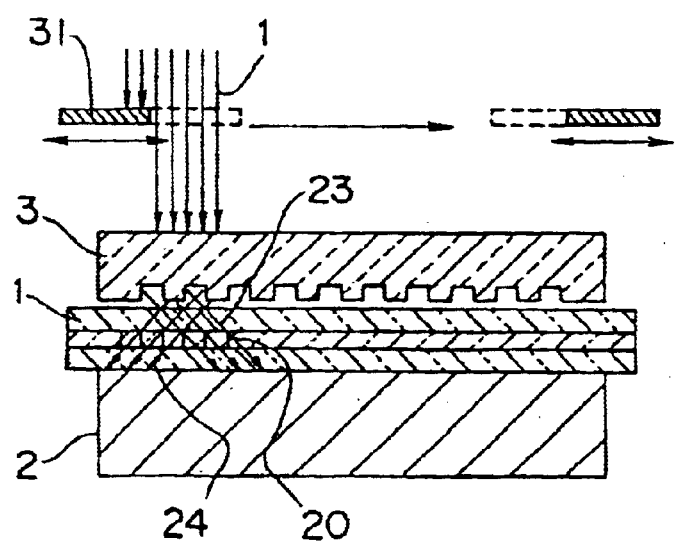
FIG. 9 is a sectional view along the optical axis of an optical waveguide in FIG. 8.

This method of manufacturing a grating differs from the method of manufacturing a grating of the second embodiment in that, as shown in FIG. 8, an irradiation range of an ultraviolet laser beam is controlled by a moving light-shielding plate 31. These methods are different from each other in that an optical waveguide 1 is fixed, and a ultraviolet laser beam 7 is moved to perform scanning. More specifically, in the method of manufacturing a grating, as shown in FIG. 8, the ultraviolet laser beam 7 is output from a beam scan laser irradiation device 30. The beam scan laser irradiation device 30 is a device including an optical system for scanning the ultraviolet laser beam 7 output from an ultraviolet laser device 6 in the direction of the optical axis of the optical waveguide. The moving light-shielding plate 31 which can move along the optical axis of the optical waveguide 1 is arranged between the beam scan laser irradiation device 30 and a phase mask 3. By the moving light-shielding plate 31, as shown in the sectional view in the direction of the optical axis in FIG. 9, the ultraviolet laser beam 7 to the outside of the predetermined range is shielded to control a range in which the ultraviolet laser beam 7 is irradiated. The optical waveguide 1, the substrate 2, and the phase mask 3 are fixed with a holder 4 such that the positional relationship between these components. Unlike the holder 4 in the first embodiment, the holder 4 in the third embodiment is fixed to the predetermined position.

Figure 10:
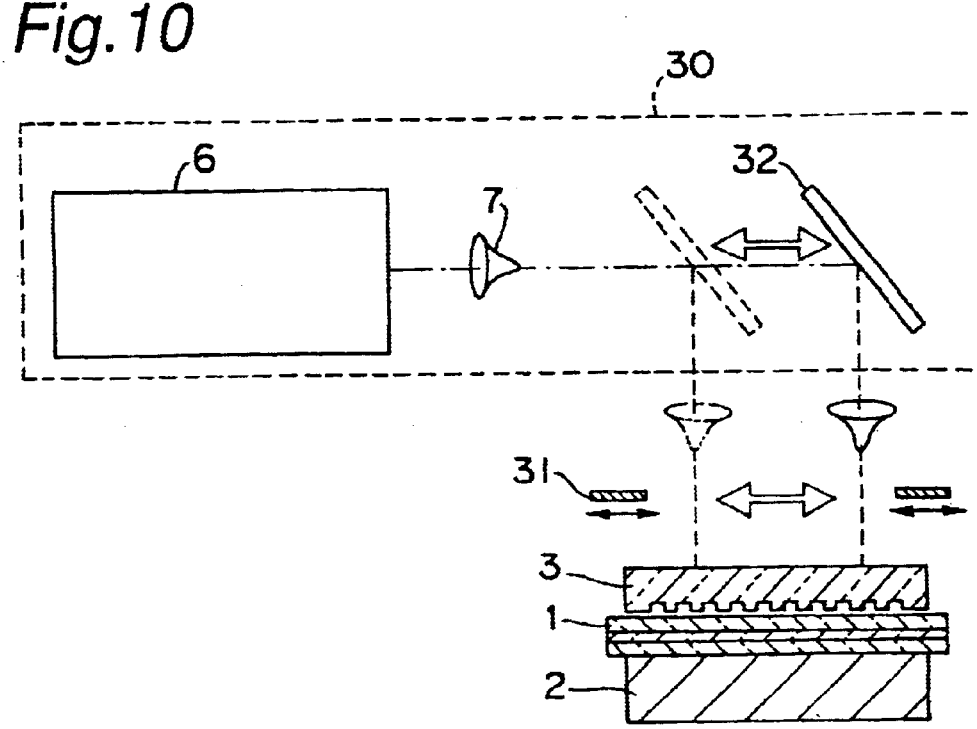
FIG. 10 is a conceptual diagram showing an operation of a beam scan laser irradiation device used in the method of manufacturing a grating of the third embodiment of the present invention.
Figure 11:
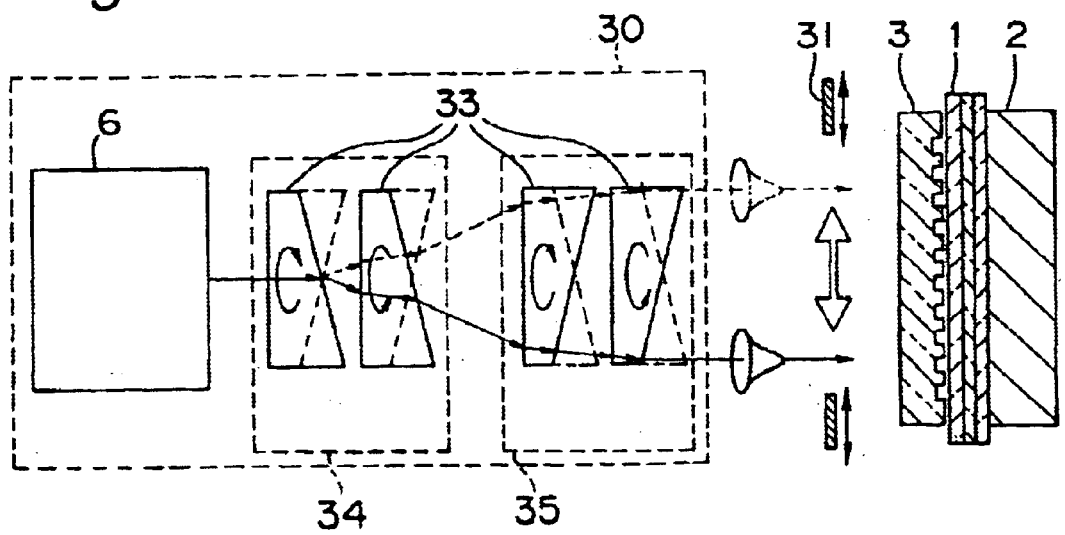
FIG. 11 is a conceptual diagram showing an operation of the beam scan laser irradiation device used in the method of manufacturing a grating of the third embodiment of the present invention.

In this case, the beam scan laser irradiation device 30, for example, can be realized by the configuration shown in FIG. 10 or 11. A method of scanning the ultraviolet laser beam 7 along the direction of the optical axis of the optical waveguide 1 by using a moving mirror 32 is shown in FIG. 10. When the moving mirror 32 are arranged to be inclined at 45° with respect to the optical axis of the ultraviolet laser beam output from the ultraviolet laser, the ultraviolet laser beam is reflected while the optical axis is changed by 90°, and the ultraviolet laser beam is perpendicularly incident on the phase mask 3 and the optical waveguide 1. In this case, the moving mirror 32 is an ultraviolet mirror which reflects ultraviolet ray. When the moving mirror 32 is moved in parallel to the direction of the optical axis of the optical waveguide 1, the ultraviolet laser beam 7 can be scanned and irradiated along the direction of the optical axis of the optical waveguide 1.

On the other hand, FIG. 11 shows a method using wedge-shaped prisms 33. Each two prisms of the four prisms 33 are paired to constitute a deflector 1 and a deflector 2. One pair of prisms of each deflector are rotated in reverse directions at angular velocities having equal absolute values and reverse signs (when one rotation angle is represented by θ, the other rotation angle is represented by −θ). One pair of prisms in which the deflector 1 and the deflector 2 have the equal rotation angles are synchronously rotated without changing the rotation angles. When the four wedge-shaped prism 33 are synchronously rotated as described above, the direction of the optical axis each time the ultraviolet laser beam 7 output from the ultraviolet laser device 6 passes through the wedge-shaped prism 33, and the ultraviolet laser beam 7 can be scanned along the direction of the optical axis of the optical waveguide. In this manner, when the four wedge-shaped prism 33 are precisely controlled with the positional relationship shown in FIG. 11, the ultraviolet laser beam 7 can be irradiated perpendicularly to the phase mask 3 and the optical waveguide 1, and can be scanned in parallel to the direction of the optical axis of the optical waveguide.

Figure 12:
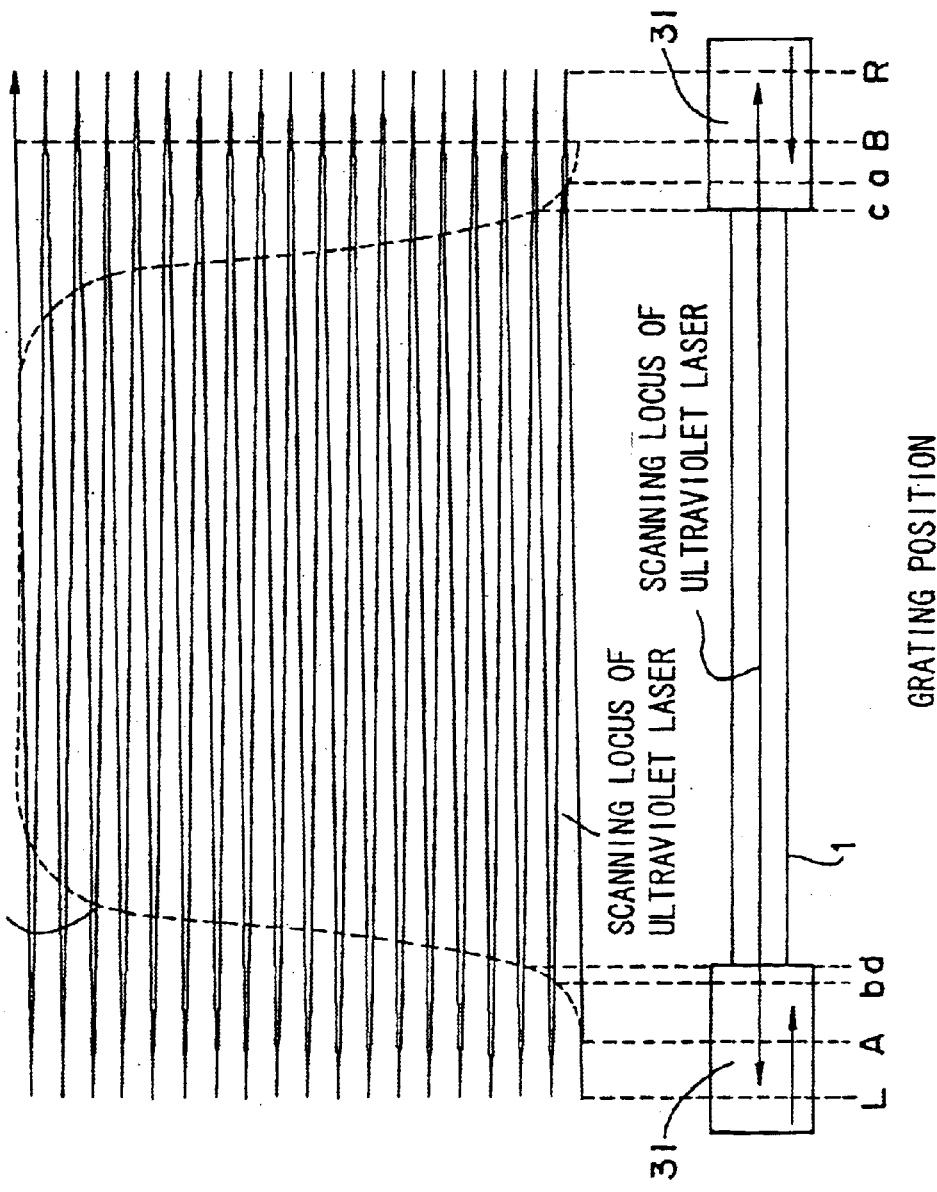
FIG. 12 is a conceptual diagram showing the relationship between a scanning locus of an ultraviolet laser beam and an accumulated distribution of irradiation amount in the method of manufacturing a grating of the third embodiment of the present invention.

In the method of manufacturing a grating, a method of controlling a scanning range of an ultraviolet laser beam by the moving light-shielding plate 31 will be described below with reference to FIG. 12. As shown in FIG. 12, a curve represented by a dotted line indicates a distribution of irradiation amount of the ultraviolet laser beam for apodization. A broken line which moves from the lower left to the lower right, reciprocates from the left to the right a plurality of times, and then reaches an upper right arrow indicates a scanning locus of the ultraviolet laser beam irradiated on an optical waveguide, and conceptually shows the relationship between the scanning locus and a distribution of irradiation amount accumulated by the scanning locus. A scanning locus of two reciprocations of the optical waveguide to the optical waveguide are shown in bottom part of FIG. 12.

In this case, in a wide range including the range in which the grating of the optical waveguide is manufactured, the ultraviolet laser beam 7 is scanned at a predetermined scanning speed between a left end L and a right end R, along the direction of the optical axis of the optical waveguide, a plurality of times. In this case, the range in which the ultraviolet laser beam 7 irradiates the optical waveguide is defined by the moving light-shielding plate 31, so that an accumulated distribution of the quantity of irradiation can be adjusted. More specifically, in the first half, the ultraviolet laser beam is scanned from the left end L, and is irradiated on the optical waveguide in a scanning range from A to a by the moving light-shielding plate 31. At this time, in a range of a to R, the ultraviolet laser beam 7 is shielded by the moving light-shielding plate 31, and does not irradiate the optical waveguide 1. In the next reciprocation, the scanning range is narrowed by the moving light-shielding plate 31 such that the right end is defined by a position c, and the ultraviolet laser beam 7 is scanned in the scanning range having a left end defined by a position d. Subsequently, similarly, the moving light-shielding plate 31 is moved to gradually narrow the scanning range, so that a grating subjected to apodization in which the quantities of radiation of the ultraviolet laser beam are small at the ends of the grating and the quantity of radiation of the ultraviolet laser beam is large at the center of the grating is manufactured. When the scanning range of the ultraviolet laser beam is controlled as described above, the accumulated distribution of the quantity of irradiation can be set to be a predetermined distribution. Thereafter, the ultraviolet laser beam is moved outside of the range of the optical waveguide in which the grating is manufactured, and manufacturing of the grating is completed. Although not shown in FIG. 12, the ultraviolet laser beam is shielded by the light-shielding mask or the like so that the ultraviolet light is not radiated outside of the range of the optical waveguide in which the grating is manufactured.

The irradiation range of the ultraviolet laser beam is controlled as described above to adjust an accumulated distribution of ultraviolet irradiation amount, so that apodization can be performed. Since a predetermined distribution of irradiation amount is not obtained by performing irradiation once, but is obtained by an accumulated distribution of irradiation amount by performing ultraviolet laser beam irradiation a plurality of times, an irradiation amount used when irradiation is performed once can be reduced. For this reason, since a scanning speed can be increased, local heating caused by local irradiation of an optical fiber can be suppressed, and local thermal expansion can be suppressed.

The method of controlling the irradiation range of the ultraviolet laser beam by controlling the position of the moving light-shielding plate 31 has the following effect. That is, when a moving stage or a beam scan mechanism are moved at a high speed to reciprocally scan the ultraviolet laser beam, the scanning speed must be reduced at the turning point. For this reason, the scanning speed may have fluctuation. In addition, the irradiation time of the ultraviolet laser beam increases due to the reduction in speed, and, accordingly, apodization may be offset from the design. On the other hand, when the irradiation range is controlled by the moving light-shielding plate 31, a portion where the speed is reduced to turn the direction can be cut. For this reason, apodization in which a predetermined distribution of irradiation amount is formed can be performed.

In the description of this embodiment, the method in which the optical wavelength is fixed, and the ultraviolet laser beam 7 is scanned. As in the method of manufacturing a grating of the first embodiment, the optical waveguide may be moved. In this case, the moving light-shielding plate 31 may be moved in accordance with the movement of the optical waveguide to control an irradiation range. Although the ultraviolet laser beam is shielded by the moving light-shielding plate 31, the shielding means is not limited to the moving light-shielding plate 31, and laser oscillation may be stopped in a region in which shielding is to be performed.

In a method of manufacturing a grating of the fourth embodiment of the present invention, an optical fiber is stored in a groove formed in a mirror surface substrate, and a reflected beam of an ultraviolet laser beam to be irradiated is monitored, so that alignment is performed such that a light receiving amount is maximum. In this manner, an ultraviolet laser beam having an energy density which is sufficient to form a grating can be irradiated.

Figure 13:
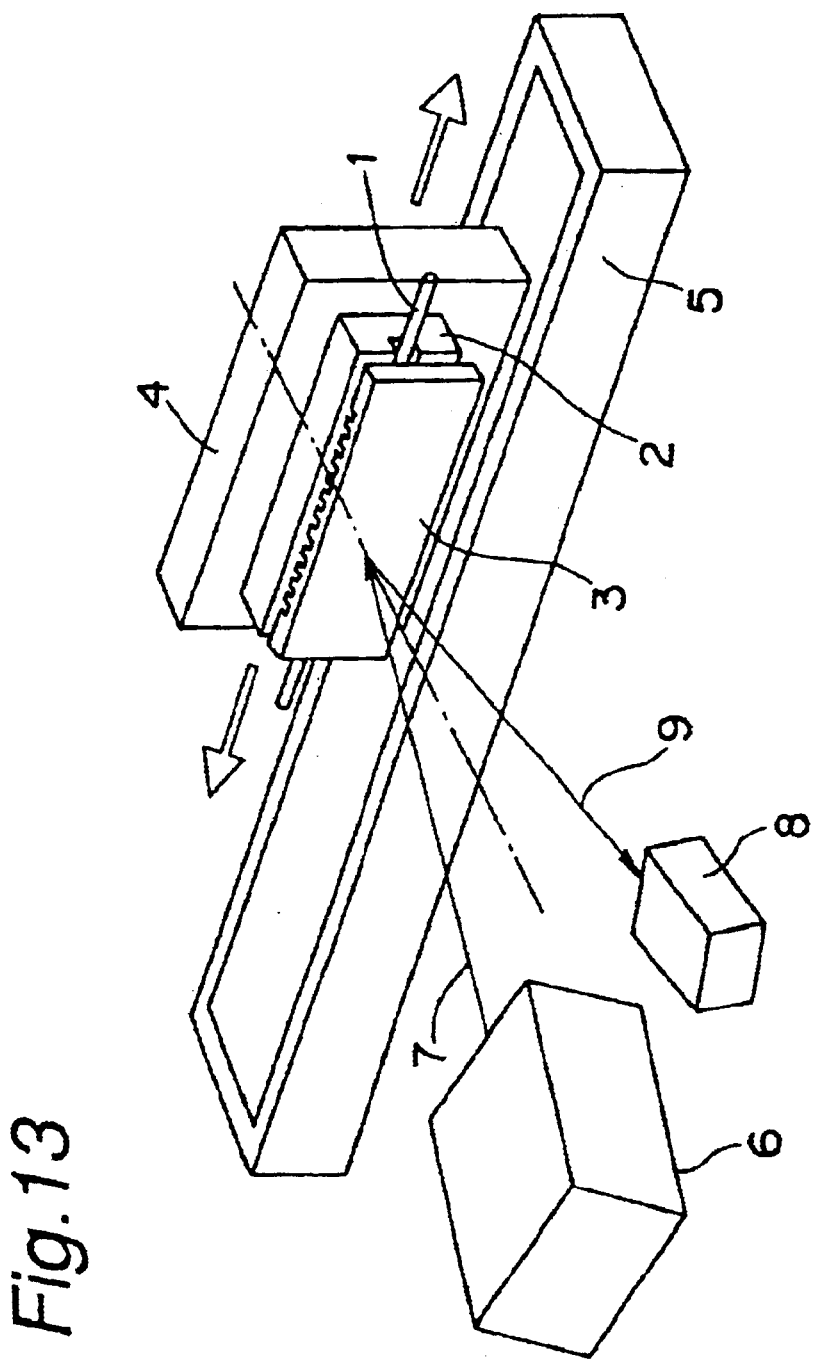
FIG. 13 is a perspective view showing the relationship between an optical waveguide and an optical system in a method of manufacturing a grating of the fourth embodiment of the present invention.
Figure 14A:
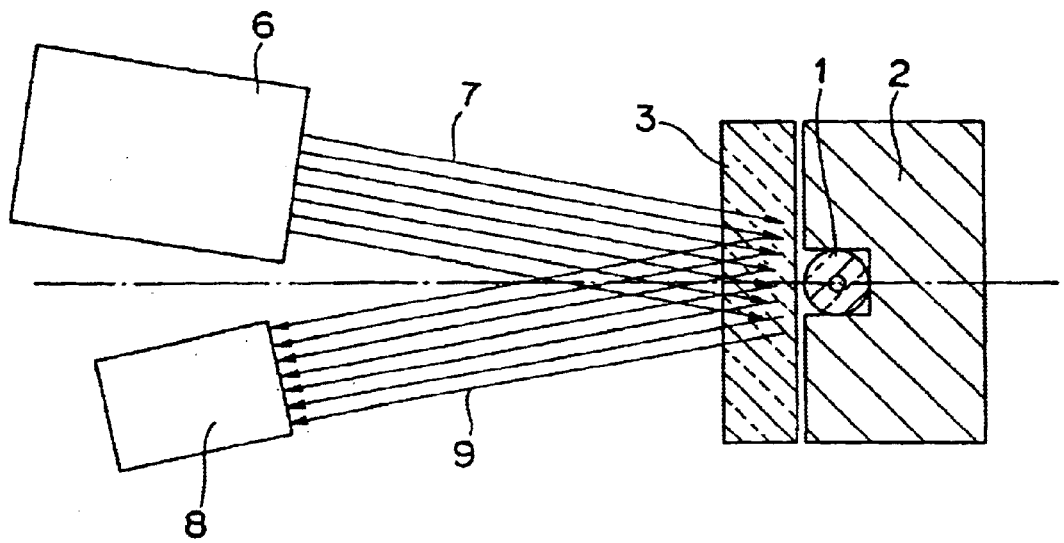
FIG. 14A is a sectional view of the optical waveguide in FIG. 13 in a radial direction.
Figure 14B:
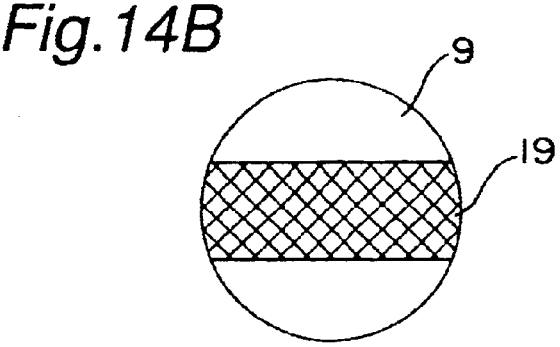
FIG. 14B is a conceptual diagram of a reflected light component.

This method of manufacturing a grating differs from a method of manufacturing a grating of the first embodiment in that, as shown in FIGS. 13 and 14, the substrate which stores an optical fiber is a mirror surface substrate. In addition, these methods are different from each other in that a CCD camera 8 for monitoring a reflected light component 9. In the method of manufacturing the grating, as in a perspective view in FIG. 13, a 0-order diffraction light component of the ultraviolet laser beam being incident on the optical waveguide is reflected by a mirror surface substrate 2, and the reflected light component 9 emitted to an ultraviolet laser device 6 is monitored by the CCD camera 8. The case in which the 0-order diffraction light component is monitored will be described below. However, a diffraction light component having any order, i.e., ±1-order, ±2-order, ±3-order, . . . diffraction light components may be used. In this case, as shown in FIG. 14A, the ultraviolet laser beam 7 is incident in a direction inclined by about 1° in the radial direction of an optical waveguide 1 with respect to a direction perpendicular to the substrate 2. The reflected light component 9 is monitored by the CCD camera 8. At this time, as shown in FIG. 14B, an ultraviolet laser beam being out of the width of the optical fiber is reflected by the mirror surface of the mirror surface substrate. On the other hand, the ultraviolet laser beam is diffusely reflected at a portion where the ultraviolet laser beam is reflected on the optical fiber. For this reason, the reflected light component 9 has such an intensity distribution that a light component irradiated on the inside of the width of the optical waveguide 1. When the reflected light component 9 is monitored by the CCD camera 8, the center of the ultraviolet laser beam can be correctly irradiated on the optical waveguide 1. For example, in a Gaussian distribution type ultraviolet laser beam having a beam diameter of 1 mm, a change in energy distribution in a region of ±100 μm from the beam center is within 3%. On the other hand, since the diameter of a general single-mode optical fiber is 125 μm, the center of the ultraviolet laser beam can be sufficiently precisely irradiated on the optical waveguide 1 by this method. In this manner, the irradiation distribution of the ultraviolet laser beam on the optical fiber can be controlled to the designed irradiation distribution, and a grating having the amplitude error which is reduced can be manufactured.

In this case, the mirror surface substrate 2 preferably has a reflectance at which a portion from the optical fiber is apparently discriminated in the reflected light component 9. In order to correctly match the optical waveguide and the irradiation position of the ultraviolet laser beam with each other, the beam diameter of the ultraviolet laser beam is preferably large. In this case, since an ultraviolet laser beam using the second harmonic of a conventionally used Ar laser has a small energy intensity, the ultraviolet laser beam must be converged to be excited, and the ultraviolet laser beam is not always suitable. In contrast to this, the fourth harmonic of an Nd-YAG laser excited by the semiconductor light source has a large energy intensity, and the fourth harmonic need not be converted, so that the fourth harmonic is preferable.

In the description of the method of manufacturing a grating, the optical fiber serving as an optical waveguide is arranged in the groove of the mirror surface substrate 2. However, the optical fiber may be arranged on the mirror surface substrate in which no groove is formed. Even though a PLC obtained by forming an optical waveguide on an Si substrate is used, an ultraviolet laser beam is slightly diffusely reflected a portion where a core is formed. For this reason, similarly, the optical waveguide and the irradiation position of the ultraviolet laser beam can be correctly matched with each other. In addition, even though a PLC obtained by forming an optical waveguide on a silica substrate is used, by arranging a mirror surface substrate on a rear surface of the PLC, like the PLC in which the optical waveguide is formed on the Si substrate, the optical waveguide and the irradiation position of the ultraviolet laser beam can be correctly matched with each other. In place of the CCD camera 8, a monitor means such as a beam profiler for measuring the energy distribution of a laser beam may be used.

A groove may be formed parallel to an optical waveguide at a position being a predetermined length distant from the optical waveguide of a planar light wave circuit (PLC) obtained by an optical waveguide in an Si or silica substrate. The reflected light component 9 obtained when an ultraviolet laser beam is irradiated on the groove is monitored by the CCD camera 8 to perform alignment. Thereafter, the optical waveguide is shifted by a predetermined length, so that the ultraviolet laser beam can be irradiated at a high precision.

In a method of manufacturing a grating of the fifth embodiment of the present invention, an ultraviolet laser beam is scanned while locally cooling a portion on which the ultraviolet laser beam is irradiated. When the portion is locally cooled, a local increase in temperature of an optical fiber can be suppressed, and local thermal expansion can be suppressed.

Figure 15A:
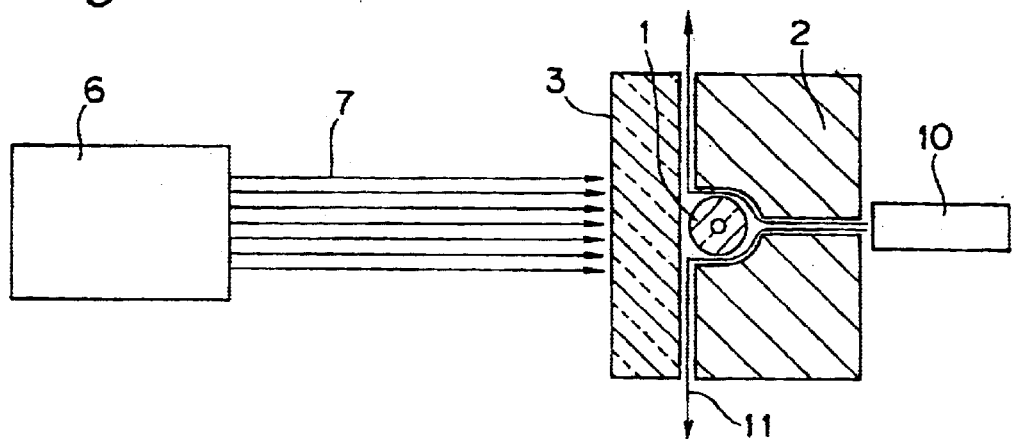
FIG. 15A is a sectional view of an optical waveguide in a radial direction showing a local cooling method in a method of manufacturing a grating of the fifth embodiment of the present invention.
Figure 15B:
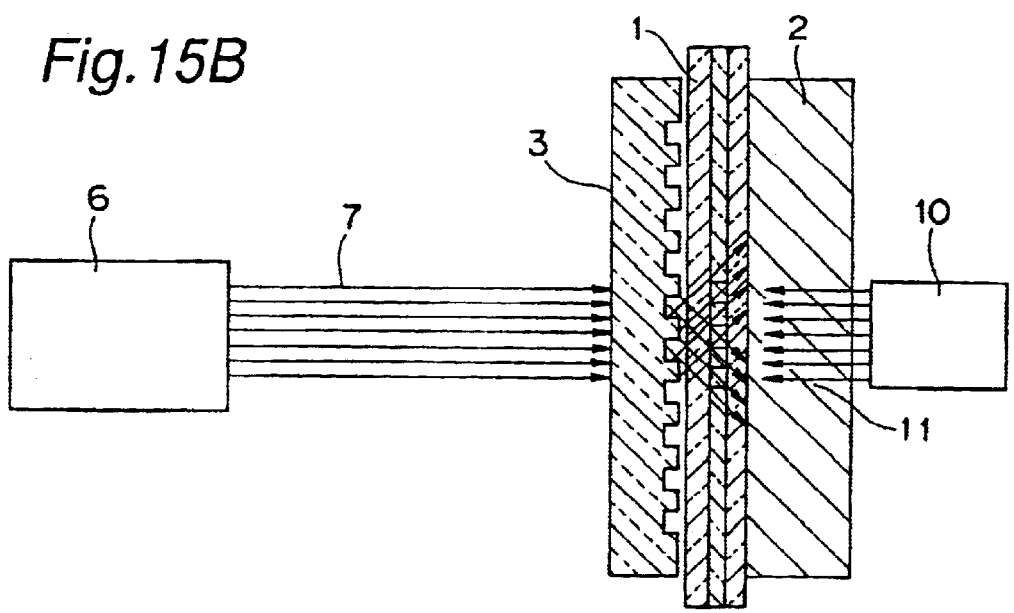
FIG. 15B is a sectional view of the optical waveguide in the direction of the optical axis.

This method of manufacturing a grating differs from the method of manufacturing a grating of the first embodiment in that the ultraviolet laser beam is irradiated while locally cooling a portion on which an ultraviolet laser beam is irradiated. As the locally cooling method, for example, as shown in a sectional view in a radial direction in FIG. 15A or a sectional view in the direction of an optical axis in FIG. 15B, an air cooling method in which a gas flow 11 such as an air flow is blown from the rear surface of a substrate 2 may be used. In this case, a hole for blowing the gas flow 11 such as an air flow is formed in the rear surface of the substrate 2 along the optical fiber 1, and a blower 10 serving as a cooling means is arranged on a straight line corresponding to the ultraviolet laser beam 7. The gas flow 11 such as an air flow is blown out of the blower 10, and blown against an optical waveguide 1. The blower 10 may be moved according to scanning the ultraviolet laser beam 7. In the above configuration, the gas flow 11 is blown against only a portion on which the ultraviolet laser beam 7 of the optical waveguide 1 is locally irradiated, so that local thermal expansion caused by local heating of the optical waveguide 1 can be suppressed. The flow rate of the gas flow 11 is adjusted such that the local position of the optical waveguide 1 is excessively cooled in comparison with the peripheral portion. The temperature of a portion of the optical waveguide 1 on which the optical waveguide 1 is locally irradiated and the temperature of a portion on which no optical waveguide 1 is irradiated are kept equal. In this manner, a phase error generated by distortion of a grating pitch caused by local thermal expansion of the optical waveguide 1 can be reduced.

In the method of manufacturing a grating, the optical fiber is arranged on the substrate having a hole formed in the rear surface. However, an optical waveguide may be arranged in the air without using a substrate, and the optical waveguide may be cooled from the rear surface by air cooling. The cooling means is not limited to an air cooling method. For example, the following method may be used. That is, an optical waveguide is arranged on a substrate on which a plurality of Peltier elements are arranged along the direction of the optical axis of the optical waveguide, a portion on which the ultraviolet laser beam is irradiated is selectively cooled. Of various cooling methods, a method of suppressing local heating by an air cooling method using air-blowing can be realized by a very simple configuration, and adjustment can be performed by only changing the flow rate of a gas flow. For this reason, a production device can be constituted at low cost.

What is claimed is:

1. A method of manufacturing a grating in an optical waveguide comprising:
    providing an optical waveguide comprising a core made of a material having a refractive index that changes in response to irradiation with radiation and a cladding covering the core; and scanning the optical waveguide with interference fringes of light, produced by a laser beam, along an optical axis of the optical waveguide a plurality of times to modulate the refractive index of the core, while controlling irradiation range along the core by the interference fringes of light produced by the laser beam, so that the irradiation range along the core is different, when the core is scanned two of the plurality of times and a predetermined distribution of radiation is produced in a direction of an optical axis of the grating produced in the core.

2. A method of manufacturing a grating in an optical waveguide comprising:

providing an optical waveguide comprising a core made of a material having a refractive index that changes in response to irradiation with radiation and a cladding covering the core; and scanning a laser beam along an optical axis of the optical waveguide to modulate the refractive index of the core, at a scanning speed not lower than a scanning speed defined by an energy density per unit time of the laser beam and laser beam diameter to avoid a local temperature rise in the optical waveguide not exceeding a threshold temperature rise.

3. The method of manufacturing a grating according to claim 2, wherein the scanning speed is not lower than $$B^2/(85 \cdot E^{-1.2})(\text{mm/second})$$

where E is the energy density per unit time of the laser beam in $mW/cm^2$ and B is the beam diameter in mm.

4. A method of manufacturing a grating including:

providing an optical waveguide comprising a core made of a material having a refractive index that changes in response to irradiation with radiation and a cladding covering the core;

scanning a laser beam along an irradiation range of an optical axis of the optical waveguide to modulate the refractive index of the core, at a scanning speed not lower than a scanning speed defined by an energy density per unit time of the laser beam and laser beam diameter; and controlling the irradiation range, and scanning the optical waveguide with the laser beam a plurality of times so that a predetermined distribution of radiation is obtained in a direction of an optical axis of the grating produced in the core.

5. The method of manufacturing a grating according to claim 1, wherein the optical waveguide is arranged on a thermally conductive substrate.

6. The method of manufacturing a grating according to claim 5, including scanning the laser beam along the optical axis of the optical waveguide at a scanning speed not lower than a scanning speed defined by energy density per unit time of the laser beam, laser beam diameter, and thermal conductivity of the thermally conductive substrate.

7. The method of manufacturing a grating according to claim 6, wherein the scanning speed is not lower than $$B^2/[(115 \cdot k)^{0.5} \cdot E^{-1.2}](\text{mm/second})$$

where E is the energy density of the laser beam per unit time in $mW/cm^2$, B is the beam diameter in mm, and k is the thermal conductivity of the thermally conductive substrate in $J/(m \cdot °K)$.

8. The method of manufacturing a grating according to claim 1, including scanning with a pulsed laser beam.

9. The method of manufacturing a grating according to claim 8, including producing the pulsed laser beam with a semiconductor laser.

10. The method of manufacturing a grating according to claim 8, wherein the pulsed laser beam has an energy density not lower than an energy density at which an inclination of a refractive index increase coefficient changes as a function of energy density per pulse.

11. The method of manufacturing a grating according to claim 1, wherein the optical waveguide is arranged on a mirror surface substrate for reflecting the laser beam, and including monitoring a reflected beam reflected by the mirror surface substrate, when the laser beam irradiates the optical waveguide, and adjusting relative positions of an irradiating position of the laser beam and an irradiated portion of the optical waveguide.

12. The method of manufacturing a grating according to claim 1, including locally cooling a portion of the optical waveguide being irradiated by the laser beam.

13. The method of manufacturing a grating according to claim 12, including locally cooling the optical waveguide with air.

14. The method of manufacturing a grating a grating according to claim 1, including controlling the irradiation range along the length of the core so that the irradiation range gradually decreases for each subsequent scanning of the optical waveguide.

15. The method of manufacturing a grating according to claim 2, wherein the optical waveguide is arranged on a thermally conductive substrate and including scanning the laser beam along the optical axis of the optical waveguide at a scanning speed not lower than a scanning speed defined by energy density per unit time of the laser beam, laser beam diameter, and thermal conductivity of the thermally conductive substrate.

* * * * *